(12) United States Patent
Inagaki et al.

(10) Patent No.: US 9,325,002 B2
(45) Date of Patent: Apr. 26, 2016

(54) BATTERY ACTIVE MATERIAL, NONAQUEOUS ELECTROLYTE BATTERY AND BATTERY PACK

(71) Applicant: Kabushiki Kaisha Toshiba, Minato-ku (JP)

(72) Inventors: Hiroki Inagaki, Yokohama (JP); Takuya Iwasaki, Uenohara (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 33 days.

(21) Appl. No.: 14/528,248

(22) Filed: Oct. 30, 2014

(65) Prior Publication Data

US 2015/0125753 A1     May 7, 2015

(30) Foreign Application Priority Data

Nov. 1, 2013   (JP) ................................ 2013-228541

(51) Int. Cl.
| | |
|---|---|
| H01M 4/48 | (2010.01) |
| H01M 4/36 | (2006.01) |
| H01M 4/485 | (2010.01) |
| H01M 10/052 | (2010.01) |

(52) U.S. Cl.
CPC .............. *H01M 4/366* (2013.01); *H01M 4/485* (2013.01); *H01M 10/052* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 2007/0292760 A1 | 12/2007 | Patoux et al. |
| 2010/0015509 A1 | 1/2010 | Inagaki et al. |
| 2010/0243968 A1 | 9/2010 | Taniguchi et al. |
| 2011/0206991 A1* | 8/2011 | Nakahara ............... C01B 25/00 429/231.5 |
| 2012/0070726 A1 | 3/2012 | Hoshina et al. |
| 2012/0244442 A1* | 9/2012 | Harada ................. H01M 4/485 429/221 |

FOREIGN PATENT DOCUMENTS

| | | |
|---|---|---|
| JP | 2008-34368 | 2/2008 |
| JP | 2008-047412 | 2/2008 |
| JP | 2008-117625 | 5/2008 |
| JP | 2010-287496 | 12/2010 |

(Continued)

OTHER PUBLICATIONS

René Marchand, et al., "TiO$_2$(B) A new form of Titanium Dioxide and the Potassium Octatitanate K$_2$Ti$_8$O$_{17}$", Material Research Bulletin, vol. 15, 1980, pp. 1129-1133.

(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

A battery active material according to an embodiment includes a niobium composite oxide and a phosphorus compound being present in at least a part of the surface of the niobium composite oxide. A nonaqueous electrolyte battery according to the embodiment includes a negative electrode including the battery active material according to the embodiment, a positive electrode, and a nonaqueous electrolyte. A battery pack according to the embodiment includes at least one nonaqueous electrolyte battery according to the embodiment.

10 Claims, 7 Drawing Sheets

(56) References Cited

FOREIGN PATENT DOCUMENTS

| | | |
|---|---|---|
| JP | 2012-69352 | 4/2012 |
| JP | 5050452 | 10/2012 |
| JP | 2013-41844 | 2/2013 |
| WO | WO 2009/028553 A1 | 3/2009 |

OTHER PUBLICATIONS

C.M. Reich et al. "Niobia Based Rutile Materials as SOFC Anodes", Fuel Cells, 2001, 7 pages.

* cited by examiner

BATTERY ACTIVE MATERIAL, NONAQUEOUS ELECTROLYTE BATTERY AND BATTERY PACK

CROSS-REFERENCE TO RELATED APPLICATION

This application is based upon and claims the benefit of priority from Japanese Patent Application No. 2013-228541, filed Nov. 1, 2013, the content of which is incorporated herein by reference.

FIELD

Embodiments of the present invention relate to a battery active material, a nonaqueous electrolyte battery, and a battery pack.

BACKGROUND

In recent years, nonaqueous electrolyte batteries such as lithium ion secondary batteries have been developed as batteries with high energy density. The nonaqueous electrolyte batteries are anticipated as power sources of hybrid vehicles or electric vehicles and also as uninterruptible power sources of mobile phone base stations. Therefore, the nonaqueous electrolyte batteries are required to have not only basic characteristics of batteries but also other characteristics such as high-speed charging and discharging performance and long-term reliability. The nonaqueous electrolyte batteries capable of performing high-speed charging and discharging have the advantage that a charging time is considerably short. In hybrid vehicles on which the nonaqueous electrolyte batteries capable of performing high-speed charging and discharging are mounted, power performance can be improved and regenerative energy of power can be efficiently collected.

The above-described high-speed charging and discharging can be realized by rapid movement of electrons and lithium ions between a positive electrode and a negative electrode. Nonaqueous electrolyte batteries of the related art include carbon-based negative electrodes having a negative electrode active material formed of a carbonaceous matter. In batteries using carbon-based negative electrodes, dendrites of metal lithium on negative electrodes may precipitate when high-speed charging and discharging are repeated. Since such dendrites cause electric short-circuit inside nonaqueous electrolyte batteries, there is a probability of heat generation or ignition being caused.

Accordingly, to prevent dendrites of metal lithium from precipitating, batteries using a composite metal oxide as a negative electrode active material instead of a carbonaceous matter have been developed. In particular, batteries using a titanium oxide as a negative electrode active material can perform stable high-speed charging and discharging and have characteristics of a longer lifespan than a carbon-based negative electrode.

However, the potential of a titanium oxide with respect to metal lithium is higher (nobler) than that of a carbonaceous matter. Further, an electric capacity per weight of a titanium oxide is low. Therefore, there is a problem in that a weight energy density is lower in batteries using a titanium oxide.

For example, an electrode potential of a titanium oxide is about 1.5 V based on metal lithium and is higher (nobler) than the potential of a carbon-based negative electrode. Since the potential of a titanium oxide is caused by an oxidation-reduction reaction between $Ti^{3+}$ and $Ti^{4+}$ when lithium is electrochemically inserted and desorbed, the potential of the titanium oxide is electrochemically restricted.

For an electric capacity per unit weight, the theoretical capacity of a lithium-titanium composite oxide such as a general formula: $Li_4Ti_5O_{12}$ is about 175 mAh/g. On the other hand, the theoretical capacity of a general graphite-based electrode material is 372 mAh/g. Accordingly, a capacity density of a titanium oxide is considerably lower than that of a carbon-based negative electrode. This is because the number of sites absorbing lithium is small in a crystal structure of the titanium oxide.

In view of the above description, new electrode materials containing Ti or Nb have been examined and such materials are expected to have a high charging and discharging capacity. In particular, a titanium-niobium composite oxide represented by a general formula: $TiNb_2O_7$ has a high theoretical capacity exceeding 300 mAh/g.

However, in an oxide operating with a noble potential of about 1.5 V vs $Li/Li^+$, such as $TiNb_2O_7$, there are problems in that it is difficult to form a surface film and decomposition (that is, a side reaction) of an electrolyte easily continues on an electrode active material or an electrode surface.

DETAILED DESCRIPTION

Figure 1:
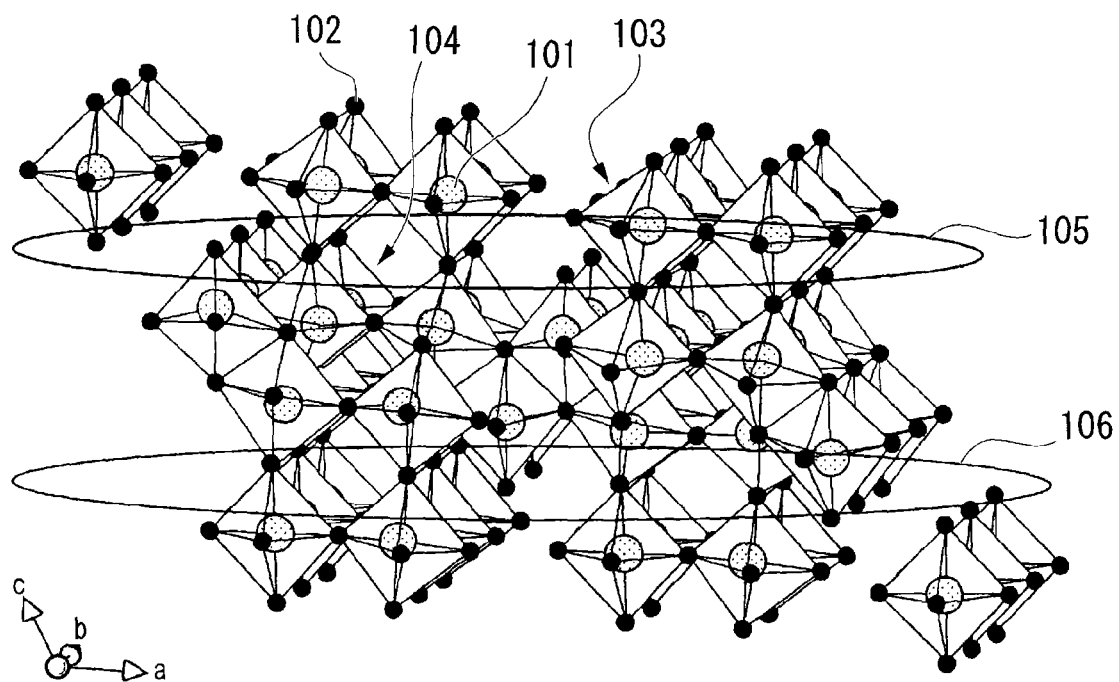
FIG. 1 is a schematic diagram illustrating a crystal structure of a niobium composite oxide in a battery active material according to a first embodiment.

The battery active material includes a niobium composite oxide; and a phosphorus compound being present on at least a part of the surface of the niobium composite oxide.

Hereinafter, a battery active material, a nonaqueous electrolyte battery, and a battery pack according to embodiments will be described with reference to the drawings.

First Embodiment

A battery active material according to a first embodiment has a characteristic in that a phosphorus compound is present in at least a part of the surface a niobium composite oxide. The phosphorus compound may be attached to a part of the surface or the entire surface of the battery active material or may cover a part of the surface or the entire surface of the battery active material.

The niobium composite oxide contained in the battery active material according to the embodiment preferably has a granular shape and, in particular, is preferably formed as primary particles with an average particle diameter of 0.01 µm to 10 µm.

The average particle diameter of the primary particles is more preferably within the range of 0.1 µm to 1 µm.

The battery active material according to the embodiment is preferably formed of aggregated particles (secondary particles) which are primary particles of the niobium composite oxide. An average particle diameter of the aggregated particles is preferably within the range of 1 µm to 100 µm, and is more preferably within the range of 3 µm to 30 µm.

When the average particle diameter of the primary particles of the niobium composite oxide is equal to or greater than 0.01 µm, treatment is easy in terms of industrial production. When the average particle diameter of the primary particles of the niobium composite oxide is equal to or less than 10 µm, lithium ions can smoothly diffuse inside a solid of the niobium composite oxide.

When the average particle diameter of the aggregated particles (secondary particles) which are the primary particles of the niobium composite oxide is equal to or greater than 1 µm, treatment is easy in terms of industrial production. When the average particle diameter of the aggregated particles is equal to or less than 100 µm, it is easy to allow the mass and the thickness to be uniform at the time of formation of a coated film for producing an electrode, and surface smoothness is improved.

A specific surface area of the foregoing secondary particles is preferably equal to or greater than 5 $m^2/g$ and equal to or less than 50 $m^2/g$, and is more preferably equal to or greater than 10 $m^2/g$ and equal to or less than 30 $m^2/g$. When the specific surface area is equal to or greater than 5 $m^2/g$, it is possible to sufficiently ensure absorption and desorption sites of lithium ions. When the specific surface area is equal to or less than 50 $m^2/g$, treatment is easy in terms of industrial production.

A crystal structure of the niobium composite oxide forming the battery active material according to the embodiment preferably belongs to a monoclinic system and its space group is preferably C/2m or P12/ml. Since the battery active material having such a space group has a high structural stability and collapse of the crystal structure does not occur easily even when an insertion and desorption reaction of lithium ions is repeated, excellent charging and discharging cycle performance is exhibited. In the embodiment, the niobium composite oxide may have a crystal structure with an atomic coordinate described in Non Patent Literature 1.

Next, a basic crystal structure of the niobium composite oxide will be described with reference to FIGS. 1 and 2.

Figure 2:
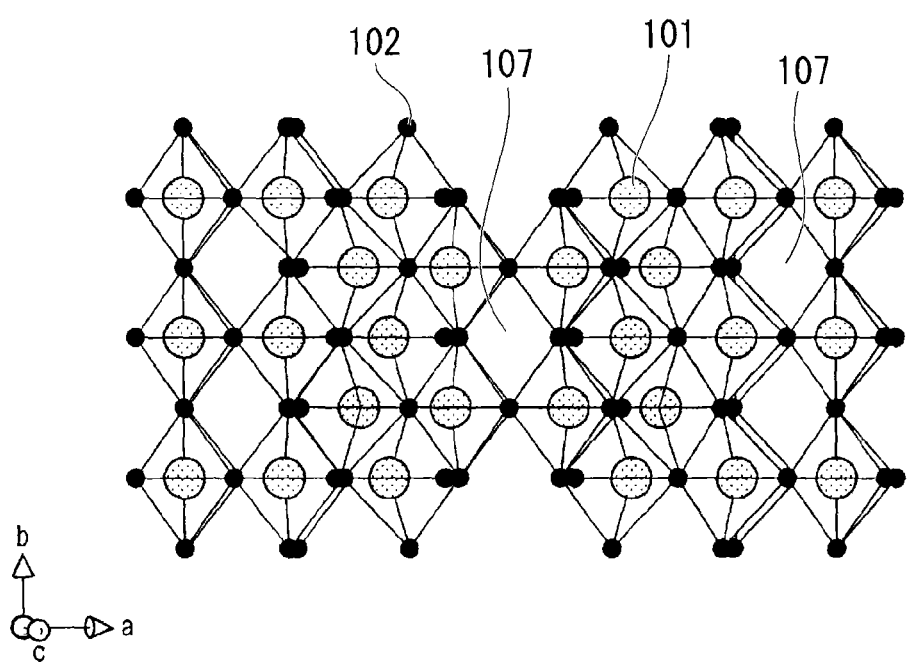
FIG. 2 is a schematic diagram illustrating the crystal structure illustrated in FIG. 1 in another direction.

As illustrated in FIG. 1, in the crystal structure of the monoclinic type niobium composite oxide ($TiNb_2O_7$), metal ions 101 and oxide ions 102 form skeletal structure portions 103. In the metal ions 101, Nb ions and Ti ions are disposed at random at a ratio of Nb:Ti=2:1. When the skeletal structure portions 103 are disposed alternately 3-dimensionally, gap portions 104 are formed between the skeletal structure portions 103. The gap portions 104 are hosts of lithium ions.

In FIG. 1, regions 105 and 106 are portions that have 2-dimensional channels in the [100] and [010] directions. As illustrated in FIG. 2, gap portions 107 extending in the [001] direction are present in the regions 105 and 106 of the crystal structure of the monoclinic type $TiNb_2O_7$. The gap portions 107 have a tunnel structure advantageous to conductivity of lithium ions and serve as conductive paths in the [001] direction connecting the regions 105 and 106. Since the conductive paths are present, lithium ions can reciprocate between the regions 105 and 106.

Thus, since having a large insertion space equivalent to lithium ions, the monoclinic type crystal structure is structurally stable. The 2-dimensional channel-including regions, in which diffusion of lithium ions is fast, and the conductive path in the [001] direction connecting the regions are present in the monoclinic type crystal structure. Thereby, insertion and desorption of the lithium ions into and from insertion spaces are improved, and insertion and desorption spaces of the lithium ions are effectively increased. Thus, it is possible to provide a high capacity and high rate performance.

In the foregoing crystal structure, when lithium ions are inserted into the gap portions 104, the metal ions 101 forming the skeleton are reduced to trivalence and crystalline electro-neutrality is accordingly maintained. In the monoclinic oxide represented by $TiNb_2O_7$, not only are Ti ions reduced from tetravalent to trivalent, but Nb ions are also reduced from pentavalence to trivalence. Therefore, a reduction valence per active material mass is large. For this reason, even when many lithium ions are inserted, the crystalline electro-neutrality can be maintained. Therefore, the energy density of $TiNb_2O_7$ is higher than that of a compound such as a titanium oxide containing only tetravalent cations. The theoretical capacity of the monoclinic oxide represented by $TiNb_2O_7$ is about 387 mAh/g, which is a value equal to or greater than twice that of a titanium oxide having a spinel structure.

The monoclinic oxide represented by $TiNb_2O_7$ has a lithium absorption potential of about 1.5 V (vs $Li/Li^+$). Therefore, by using the active material having a crystal structure represented by $TiNb_2O_7$, it is possible to provide a battery that has excellent rate performance, can perform stable charging and discharging repeatedly at a high speed, and has high energy density.

As the niobium composite oxide, a material having a general formula $M_{(1-y)}Nb_yNb_2O_{(7+\delta)}$ can be exemplified. As an example of M, y, and $\delta$ in the general formula $M_{(1-y)}Nb_yNb_2O_{(7+\delta)}$, for example, a case in which M is Ti, y is 0, and $\delta$ is 0 can be exemplified. In this case, a composition formula of the niobium composite oxide is $TiNb_2O_7$. As another example, a case in which M is Ti and Zr at a ratio of 0.9 to 0.1, y is 0, and $\delta$ is 0 can be exemplified. In this case, a composition formula of the niobium composite oxide is $Ti_{0.9}Zr_{0.1}Nb_2O_7$. As still another example, a case in which M is Ti, y is 0.1, and $\delta$ is 0.05 can be exemplified. In this case, a composition formula of the niobium composite oxide is $Ti_{0.9}Nb_{2.1}O_{7.05}$. As yet another example, a case in which M is one of Ti and Zr, y is 1, and $\delta$ is 0.5 can be exemplified. In this case, a composition formula of the niobium composite oxide is $Nb_3O_{15/2}$ or $Nb_2O_5$.

A material represented by a general formula $\{Li_xM_{(1-y)}Nb_yNb_2O_{(7+\delta)}\}$ (where in the general formula, M is at least one selected from Ti and Zr and x, y, and $\delta$ satisfy relational expressions of $0 \le x \le 6$, $0 \le y \le 1$, and $-1 \le \delta \le 1$) is preferable as the niobium composite oxide. Further, the niobium composite oxide preferably has a monoclinic type crystal structure. In the niobium composite oxide represented by this general formula, Li is contained within the range of $0 \le x \le 6$. Li is lithium inserted or desorbed with charging and discharging when the niobium composite oxide is used as a negative electrode active material of a nonaqueous electrolyte battery.

The present inventors intensively examined the niobium composite oxide represented by the general formula $Li_xM_{(1-y)}Nb_yNb_2O_{(7+\delta)}$ and found that a concentration of acid sites in a solid acid is high. An electrolyte used in a nonaqueous electrolyte battery is readily decomposed at acid sites in a solid acid of the battery active material, which leads to deterioration of charging and discharging efficiency of a battery. As the result of the decomposition of the electrolyte, a decomposition product such as lithium fluoride or lithium oxide is deposited on the surface of the active material and increases resistance of a battery. The electrolyte and the decomposition product lead to deterioration of the battery performance such as lifespan performance or high current performance.

In the invention, acid sites in a solid acid can be reduced by allowing a phosphorus compound to be present on at least a part of the surface of the battery active material in the battery active material containing a niobium composite oxide.

The advantages of the invention can be obtained by disposing the phosphorus compound on a part of the surface of the battery active material. When most of the surface or the entire surface of the battery active material is covered with the phosphorus compound, a higher advantage is obtained. By adopting such a battery active material, it is possible to suppress reactivity between the active material and the electrolyte and improve initial charging and discharging efficiency. It is also possible to contribute to excellent charging and discharging cycle performance.

The foregoing phosphorus compound is preferably, for example, a phosphorus composite oxide or a phosphoric acid. Examples of the phosphorus composite oxide include a phosphoric oxide, a phosphorus-niobium composite oxide, a phosphorus-titanium composite oxide, and a phosphorus-titanium-niobium composite oxide. One or two or more of the exemplified phosphorus compounds are preferably present in the electrode active material according to the embodiment.

In the battery active material according to the embodiment, an amount of phosphorus in the phosphorus compound with respect to the entire mass of the battery active material is preferably equal to or greater than 0.02% by mass and equal to or less than 3% by mass (specifically, equal to or less than 3.1% by mass), is more preferably equal to or less than 1% by mass (specifically, equal to or less than 1.0% by mass), and further preferably equal to or less than 0.50% by mass. By setting the density of phosphorus in the battery active material to be equal to or greater than 0.02% by mass, it is possible to sufficiently obtain the advantages of reducing the above-described acid sites in a solid acid, thereby reducing a side reaction with the electrolyte and preventing a high-resistance coated film from being excessively formed. Even when the amount of phosphorus is abundant on the surface of the battery active material, the advantages of the invention are not lost. However, since the abundant amount of phosphorus leads to deterioration in an active material mass and may become a resistant component at the time of movement of lithium ions, the foregoing density of phosphorus is preferably equal to or less than 3% by mass.

The amount of phosphorus contained in the battery active material can be measured according to acid decomposition-inductively coupled plasma (ICP) emission spectroscopy (an example of a measurement apparatus: SPS-4000 manufactured by SII Nanotechnology Inc.).

The presence of phosphorus can be determined using an Electron Probe MicroAnalyser (EPMA) or Transmission Electron Microscope-Energy Dispersive X-ray (TEM-EDX) analysis on the cross-sectional surface of the active material according to line analysis, a mapping image, or the like.

Since phosphorus ions indicating the presence of a phosphorus compound are present on the surface of the battery active material according to the embodiment, the present of the phosphorus ions can be confirmed using Fourier Transform Infrared Spectroscopy (FT-IR). Since a peak originating from the phosphate ions is shown in a region of $1050\pm30$ cm$^{-1}$ of an infrared reflectance spectrum in the battery active material according to the embodiment, it may be confirmed whether the peak is present or absent in this region. The peak shown in the region of $1050\pm30$ cm$^{-1}$ can be, of course, detected from the battery active material before the battery active material is embedded into a nonaqueous electrolyte battery. The battery active material can also be confirmed by decomposing a battery, extracting the battery active material, and measuring the battery active material after the battery starts to be used as the nonaqueous electrolyte battery.

After the battery active material according to the embodiment starts to be used as a nonaqueous electrolyte battery, an infrared absorption peak is shown in a region of $1650\pm30$ cm$^{-1}$ of an infrared diffuse reflectance spectrum using Fourier Transform Infrared Spectroscopy (FT-IR). The infrared absorption peak is not detected from the battery active material before the battery active material is embedded into the nonaqueous electrolyte battery. Therefore, a material is considered to originate from the material on the surface of the battery active material as the result of the progress of a charging and discharging reaction. No infrared absorption peak is shown in the region of $1650\pm30$ cm$^{-1}$ from the battery active material in which a phosphate compound is not attached to the surface. Accordingly, by decomposing the nonaqueous electrolyte battery during use or after use, extracting the battery active material, and measuring an infrared reflectance spectrum of the region of $1650\pm30$ cm$^{-1}$, it is possible to determine whether the extracted battery active material is the battery active material according to the embodiment. In the battery active material according to the embodiment, a material originating at the infrared absorption peak shown in the region of $1650\pm30$ cm$^{-1}$ is presumed to have a good influence on battery characteristics.

Here, when the niobium composite oxide is extracted from the inside of the battery to perform the above-described measurement, for example, the following method can be used.

First, a completely discharged battery is disassembled, an electrode (for example, a negative electrode) is extracted, and the negative electrode layer is cleaned with methyl ethyl carbonate. Then, the cleaned negative electrode layer is deactivated in water and a niobium composite oxide in the negative electrode layer may be extracted using a centrifugal separation apparatus or the like.

When the battery active material according to the embodiment is used as a negative electrode active material, the battery active material may be solely used or may be used along with another active material. As the other active material used in this case, for example, a spinel type lithium-titanium composite oxide ($Li_4Ti_5O_{12}$ or the like), an anatase type, a rutile type, a β type titanium composite oxide (a-$TiO_2$, r-$TiO_2$, β-$TiO_2$, or the like), or an iron composite sulfide (FeS, $FeS_2$, or the like) can be used.

In the embodiment, even when the battery active material is used as a positive electrode active material, the battery active material may be solely used or may be used along with another active material. As the other active material used in this case, for example, a spinel type lithium-titanium composite oxide ($Li_4Ti_5O_{12}$ or the like), an anatase type, a rutile type, a β type titanium composite oxide (a-$TiO_2$, r-$TiO_2$, β-$TiO_2$, or the like), or an iron composite sulfide (FeS, $FeS_2$, or the like) can also be used.

As described above, when another active material is included in the electrode, for example, the amount of phosphorus can be measured according to the following example.

First, a negative electrode active material extracted from an electrode is provided to a TEM-EDX and a crystal structure of particles is specified according to a restricted vision field diffraction method. Then, the particles having a diffraction pattern belonging to a niobium composite oxide are selected and a phosphorus content is measured. At this time, when a phosphorus mapping image is acquired with the EDX, an existence region of phosphorus can be known.

Even when the amount of phosphorus is measured using Fourier Transform Infrared Spectroscopy (FT-IR), a niobium composite oxide extracted according to the same method is fixed to a measurement tool to be measured. For example, the amount of phosphorus can be measured using the following apparatuses and conditions:

(a) Fourier Transform Infrared Spectroscopy (FT-IR): FTS-60A (manufactured by BioRad Digilab Inc.);
(b) Light Source: special ceramics;
(c) Detector: DTGS;
(d) Wavenumber Resolution: 4 cm$^{-1}$:
(e) Cumulated Number: 256 times;
(f) Auxiliary Equipment: diffuse reflectance measurement apparatus (manufactured by PIKE Technology Inc.), window plate $CaF_2$; and
(g) Reference: Gold.

(Producing Method)

Next, a method of producing the niobium composite oxide, on the surface of which the phosphorus compound is disposed, will be described.

In the embodiment, the average particle diameters of the primary particles and the secondary particles can be adjusted by varying a time and a temperature of a thermal treatment.

A method of producing the niobium composite oxide according to the embodiment includes a process of obtaining the niobium composite oxide represented by the general formula $\{Li_xM_{(1-y)}Nb_yNb_2O_{(7+\delta)}\}$ through a solid-phase reaction and a process of disposing the phosphorus compound on the surface of the niobium composite oxide.

First, a starting material is mixed. An oxide or salt arbitrarily containing Ti, Nb, and Zr is used as the starting material. When $TiNb_2O_7$ is compounded, an oxide such as titanium dioxide or niobium pentoxide can be used as the starting material. A salt, such as a hydroxide salt, a carbonate, and a nitride, which is decomposed at a relatively low temperature and generates an oxide, is preferable as the salt used as the starting material, and niobium hydroxide or zirconium hydroxide is suitable.

Subsequently, the obtained mixture is pulverized so that as uniform a mixture as possible is obtained.

Subsequently, the obtained mixture is burned at a high temperature. The burning can be performed under the condition of a total of 1 hour to 100 hours within the temperature range of 900° C. to 1400° C.

Next, a method of disposing the phosphorus compound on the surface of the niobium composite oxide by coating the above-described niobium composite oxide with the phosphorus compound will be described. This method can be performed by bringing a phosphoric-acid-containing solution into direct contact with the niobium composite oxide produced according to the above-described method. For example, a process is performed as follows.

First, the niobium composite oxide compounded according to the above-described method is inserted and stirred in a water solution in which a predetermined amount of a phosphoric acid is melted in purified water. For example, by drying this solution at 80° C. to evaporate the water, it is possible to obtain the niobium composite oxide disposed by attaching the phosphoric acid on the surface.

In the embodiment, the phosphoric-acid-containing solution used in the process of disposing the phosphorus compound on the surface of the niobium composite oxide is not particularly limited. For example, not only $H_3PO_4$ or $HP_2O_7$ but also a polyphosphoric acid can be used without any limit.

By performing a thermal treatment on the niobium composite oxide to which the phosphoric acid is attached in the foregoing order again, it is preferable to form bonding of P—O—Nb. This thermal treatment may be performed in the atmosphere and the treatment conditions are 300° C. to 1000° C. (preferably 400° C. to 800° C.) and 10 minutes to 100 hours (preferably 1 hour to 24 hours). By performing the thermal treatment again under these conditions, it is possible to attach the phosphorus compound which is denser and much adhesive.

Through such processes, it is possible to attach the phosphorus compound to at least a part of the surface of the niobium composite oxide.

According to the above-described embodiment, it is possible to provide the battery active material capable of efficiently preventing a side reaction of the surface of the active material and contributing to excellent charging and discharging cycle performance.

As described above, the battery active material according to the embodiment can be used not only for the negative electrode but also for the positive electrode. Therefore, regardless of to which of the negative and positive electrodes the battery active material is applied, it is possible to obtain excellent charging and discharging cycle performance. That is, the charging and discharging cycle performance is the advantage obtained by disposing the phosphorus compound on the surface of the active material. Regardless of whether the battery active material is used for the negative electrode or the positive electrode, this advantage is not changed. Accordingly, since the battery active material according to the embodiment can be used for either the negative electrode or the positive electrode, the same advantage can be obtained in either case.

When the battery active material according to the embodiment is used for the positive electrode, a carbon-based material such as graphite or coke, metal lithium, or a lithium alloy can be used as the active material of the negative electrode which is its opposite electrode.

Second Embodiment

Next, a nonaqueous electrolyte battery according to a second embodiment will be described.

The nonaqueous electrolyte battery according to the embodiment includes at least a positive electrode, the negative electrode containing the battery active material according to the foregoing first embodiment, and a nonaqueous electrolyte. More specifically, the nonaqueous electrolyte battery according to the embodiment includes an external material, a positive electrode that is accommodated inside the external material, a negative electrode that is spatially separated from the positive electrode inside the external material, is accommodated with, for example, a separator interposed therebetween, and includes the foregoing battery active material, and a nonaqueous electrolyte with which the inside of the external material is filled.

Figure 3:
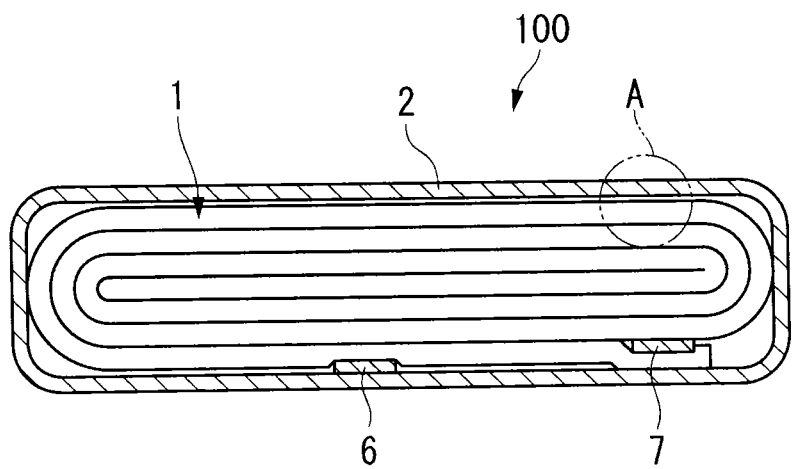
FIG. 3 is a sectional view illustrating an example of a nonaqueous electrolyte battery according to a second embodiment.
Figure 4:
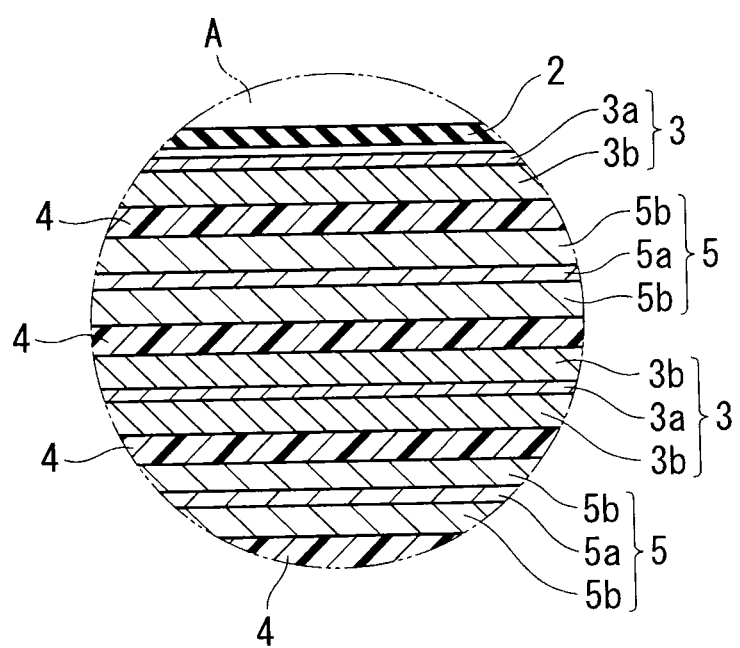
FIG. 4 is an enlarged sectional view illustrating a part A illustrated in FIG. 3.

Hereinafter, a flat type nonaqueous electrolyte battery (nonaqueous electrolyte battery) 100 illustrated in FIGS. 3 and 4 will be described as an example of the nonaqueous electrolyte battery according to the embodiment. FIG. 3 is a schematic sectional view illustrating the cross-section of the flat type nonaqueous electrolyte battery 100. FIG. 4 is an enlarged sectional view illustrating a part A illustrated in FIG. 3. These drawings are schematic diagrams for describing the nonaqueous electrolyte battery according to the embodiment. The shapes, dimensions, ratios, and the like are different from those of actual device in some portions, but design of the shape, dimensions, ratios, and the like can be appropriately modified in consideration of the following description and known technologies.

The flat type nonaqueous electrolyte battery 100 illustrated in FIG. 3 is configured such that a winding electrode group 1 with a flat shape is accommodated inside an exterior material 2. The exterior material 2 may be made by forming a laminated film in a bag-like shape or may be a metal container. The winding electrode group 1 with the flat shape is formed by spirally winding a laminate laminated from the outside, i.e., the side of the exterior material 2, in the order of a negative electrode 3, a separator 4, a positive electrode 5, and the separator 4 and performing press-molding. As illustrated in FIG. 4, the negative electrode 3 located at the outermost periphery has a configuration in which a negative electrode layer 3b is formed on one side of the inner surface of a negative electrode collector 3a. The negative electrodes 3 of portions other than the outermost periphery have a configuration in which the negative electrode layers 3b are formed on both surfaces of the negative electrode collector 3a. In the flat type nonaqueous electrolyte battery 100 according to the embodiment, the negative electrode active material in the negative electrode layer 3b is configured to include the battery active material according to the first embodiment. The positive electrode 5 has a configuration in which positive electrode layers 5b are formed on both surfaces of a positive electrode collector 5a. A gel-like nonaqueous electrolyte to be described below may be used instead of the separator 4.

In the winding electrode group 1 illustrated in FIG. 3, in the vicinity of the outer peripheral end thereof, a negative electrode terminal 6 is electrically connected to the negative electrode collector 3a of the negative electrode 3 of the outermost periphery. A positive electrode terminal 7 is electrically connected to the positive electrode collector 5a of the inside positive electrode 5, as illustrated in FIG. 4. The negative electrode terminal 6 and the positive electrode terminal 7 extend toward the outer portion of the exterior material 2 with the bag-like shape and are connected to extraction electrodes included in the exterior material 2.

When the nonaqueous electrolyte battery 100 including an exterior material formed of the laminated film is manufactured, the exterior material 2 with the bag-like shape having an opening is charged with the winding electrode group 1 to which the negative electrode terminal 6 and the positive electrode terminal 7 are connected, the liquid nonaqueous electrolyte is injected from the opening of the exterior material 2, and the opening of the exterior material 2 with the bag-like shape is subjected to heat-sealing with the negative electrode terminal 6 and the positive electrode terminal 7 interposed therebetween, so that the winding electrode group 1 and the liquid nonaqueous electrolyte are completely sealed.

When the nonaqueous electrolyte battery 100 having an exterior material formed of a metal container is manufactured, the metal container having an opening is charged with the winding electrode group 1 to which the negative electrode terminal 6 and the positive electrode terminal 7 are connected, the liquid nonaqueous electrolyte is injected from the opening of the exterior material 2, and the opening is sealed by mounting a cover member on the metal container.

For the negative electrode terminal 6, for example, a material having electric stability and conductivity within the range of a potential equal to or nobler than 1 V and equal to or lower than 3 V with respect to lithium can be used. Specifically, examples of this material include aluminum and an aluminum alloy containing an element such as Mg, Ti, Zn, Mn, Fe, Cu, or Si. The negative electrode terminal 6 may be more preferably formed of the same material as the negative electrode collector 3a in order to reduce contact resistance with the negative electrode collector 3a.

For the positive electrode terminal 7, a material having electric stability and conductivity within the range of a potential from 3 V to 4.25 V with respect to lithium can be used. Specifically, examples of this material include aluminum and an aluminum alloy containing an element such as Mg, Ti, Zn, Mn, Fe, Cu, or Si. The positive electrode terminal 7 may be more preferably formed of the same material as the positive electrode collector 5a in order to reduce contact resistance with the positive electrode collector 5a.

Hereinafter, the exterior material 2, the negative electrode 3, the positive electrode 5, the separator 4, and the nonaqueous electrolyte which are constituent members of the nonaqueous electrolyte battery 100 will be described in detail.

(1) Exterior material

The exterior material is formed of a laminated film with a thickness equal to or less than 0.5 mm, or a metal container with a thickness equal to or less than 1.0 mm is used.

The shape of the exterior material 2 can be appropriately selected from a flat type (thin type), a square type, a cylindrical type, a coin type, and a button type.

Examples of the exterior material 2 include an exterior material for a small-sized battery mounted on a portable electronic apparatus and an exterior material for a large-sized battery mounted on a two-wheeled or four-wheeled vehicle or the like according to the dimensions of the battery.

When the exterior material 2 formed of a laminated film is used, a multi-layer film in which a metal layer is interposed between resin layers is used. In this case, in the metal layer, it is preferable to utilize an aluminum foil or an aluminum alloy foil for weight reduction. For example, a polymer material such as polypropylene (PP), polyethylene (PE), nylon, or polyethylene terephthalate (PET) can be used as the resin layer. The laminated film can be molded in the shape of the exterior material by performing sealing by heat sealing.

When the exterior material 2 formed of a metal container is used, the metal container formed of aluminum, an aluminum alloy, or the like is used. As such an aluminum alloy, an alloy containing an element such as magnesium, zinc, or silicon is preferably used. When transition metal such as iron, copper, nickel, or chromium is contained in the aluminum alloy, it is preferable to suppress an amount of the transition metal to 100 or less mass ppm. When the exterior material 2 formed of a metal container is used, it is more preferable to use the metal container with a thickness equal to or less than 0.5 mm.

(2) Negative Electrode

The negative electrode 3 includes the negative electrode collector 3a and the negative electrode layer 3b that is formed on one side or both sides of the negative electrode collector 3a and includes a negative electrode active material, a conducting agent, and a binding agent.

The battery active material according to the above-described first embodiment is used as the negative electrode active material.

The nonaqueous electrolyte battery 100 into which the negative electrode 3 including the negative electrode layer 3b containing the negative electrode active material is embedded has large current characteristics and excellent charging and discharging cycle performance.

The conducting agent improves the power collection performance of the negative electrode active material and suppresses contact resistance between the negative electrode active material and the negative electrode collector. Examples of the conducting agent include agents containing acetylene black, carbon black, coke, a carbon fiber, and graphite.

The binding agent fills gaps between the dispersed negative electrode active material to bind the negative active material and the conducting agent and bind the negative electrode active material and the negative electrode collector. Examples of the binding agent include agents containing polytetrafluoroethylene (PTFE), polyvinylidene fluoride (PVdF), fluorine-based rubber, styrene-butadiene rubber (SBR), an ethylene-propylene-diene copolymer (EPDM), and carboxymethyl cellulose (CMC).

In the negative electrode layer $3b$, the negative electrode active material, the conducting agent, and the binding agent are preferably mixed at ratios of 68% by mass or more and 96% by mass or less, 2% by mass or more and 30% by mass or less, and 2% by mass or more and 30% by mass or less, respectively. The negative electrode active material, the conducting agent, and the binding agent are more preferably mixed at ratios of 70% by mass or more and 96% by mass or less, 2% by mass or more and 28% by mass or less, and 2% by mass or more and 28% by mass or less, respectively.

By setting the amount of the conducting agent to be 2% by mass or more, the power collection performance of the negative layer $3b$ can be improved and the large current characteristics of the nonaqueous electrolyte batter $100$ can be improved.

By setting the amount of binding agent to be 2% by mass or more, the binding property of the negative electrode layer $3b$ and the negative electrode collector $3a$ can be improved and the cycle characteristics can be improved.

On the other hand, in terms of large capacity, it is preferable to set the conducting agent and the binding agent to be 30% by mass or less and it is more preferable to set the conducting agent and the binding agent to be 28% by mass or less.

The negative electrode collector $3a$ is preferably an aluminum foil which is electrochemically stable within a potential range of nobler than 1 V (specifically the range of a potential equal to or nobler than 1 V and equal to or lower than 3 V with respect to lithium) or an aluminum alloy foil containing an element such as Mg, Ti, Zn, Mn, Fe, Cu, or Si. The thickness of the negative electrode collector $3a$ is preferably within the range of 8 µm to 25 µm and is more preferably within the range of 5 µm to 20 µm. In addition to the above foil, a stainless foil, a titanium foil, a copper foil, a nickel foil, or the like can be used as the negative electrode collector $3a$. For example, when a negative electrode potential is nobler than 0.3 V with respect to metal lithium or a lithium-titanium oxide is used as the negative electrode active material, it is preferable to use the foregoing aluminum foil or aluminum alloy foil since the battery weight can be suppressed.

When the foregoing aluminum foil is used as the negative electrode collector $3a$, the purity of the aluminum foil is preferably 99% or more.

When the foregoing aluminum alloy foil is used as the negative electrode collector $3a$, it is preferable to suppress a content of a transition metal such as Fe or Cu to 1% by mass or less.

The negative electrode $3$ can be produced, for example, by suspending the negative electrode active material, the conducting agent, and the binding agent in a general solvent to prepare a slurry, applying the slurry to the negative electrode collector $3a$ and performing drying, and then performing pressing. The negative electrode $3$ may be produced by forming the negative electrode active material, the conducting agent, and the binding agent in a pellet form to make the negative electrode layer $3b$, and disposing and forming the negative electrode layer $3b$ on the negative electrode collector $3a$.

(3) Positive Electrode

The positive electrode $5$ includes the positive electrode collector $5a$ and the positive electrode layer $5b$ that is formed on one side or both sides of the positive electrode collector $5a$ and includes a positive electrode active material, a conducting agent, and a binding agent. For example, an oxide, a sulfide, or a polymer can be used as the positive electrode active material.

As the oxide used for the positive electrode active material, for example, manganese dioxide ($MnO_2$) in which lithium is absorbed, an iron oxide, a copper oxide, a nickel oxide, a lithium-manganese composite oxide (for example, $Li_xMn_2O_4$ or $Li_xMnO_2$), a lithium-nickel composite oxide (for example, $Li_xNiO_2$), a lithium-cobalt composite oxide ($Li_xCoO_2$), a lithium-nickel-cobalt composite oxide (for example, $LiNi_{1-y}Co_yO_2$), a lithium-manganese-cobalt composite oxide (for example, $Li_xMn_yCo_{1-y}O_2$), a lithium-manganese-nickel composite oxide ($Li_xMn_{2-y}Ni_yO_4$) having a spinel structure, a lithium-phosphorus oxide (for example, $Li_xFePO_4$, $Li_xFe_{1-y}Mn_yPO_4$, or $Li_xCoPO_4$) having an olivine structure, iron sulfate ($Fe_2(SO_4)_3$), or a vanadium oxide (for example, $V_2O_5$) can be used. In each of the foregoing chemical formulae, x and y preferably satisfy the relational expressions of "$0<x\leq1$" and "$0\leq y\leq1$," respectively.

As a polymer used for the positive electrode active material, for example, a conductive polymer material such as polyaniline or polypyrrole or a disulfide-based polymer material can be used.

An inorganic material or an organic material such as sulfur (S) or carbon sulfide can also be used as the positive electrode active material.

Of the above examples, examples of the preferable positive electrode active materials include a lithium-manganese composite oxide ($Li_xMn_2O_4$), a lithium-nickel composite oxide ($Li_xNiO_2$), a lithium-cobalt composite oxide ($Li_xCoO_2$), a lithium-nickel-cobalt composite oxide ($LiNi_{1-y}Co_yO_2$), a lithium-manganese-nickel composite oxide ($Li_xMn_{2-y}Ni_yO_4$) having a spinel structure, a lithium-manganese-cobalt composite oxide ($Li_xMn_yCo_{1-y}O_2$), and a lithium iron phosphate ($Li_xFePO_4$) with a high positive electrode voltage. In each of the foregoing chemical formulae, x and y preferably satisfy the relational expressions of "$0<x\leq1$" and "$0\leq y\leq1$," respectively.

Of the above examples, examples of the more preferable positive electrode active materials include a lithium-cobalt composite oxide and a lithium-manganese composite oxide. Since such a positive electrode active material has high ion conductivity, diffusion of lithium ions in the positive electrode active material rarely enters a rate-controlling step in combination of the above-described negative electrode active material. Therefore, the positive electrode active material including the foregoing composition has excellent compatibility with a lithium-titanium composite oxide in the negative electrode active material.

When an ambient temperature molten salt is used as the nonaqueous electrolyte, it is preferable to use a lithium iron phosphate, $Li_xVPO_4F$, a lithium-manganese composite oxide, a lithium-nickel composite oxide, or a lithium-nickel-cobalt composite oxide in terms of a cycle lifespan. This is because reactivity between the positive electrode active material and the ambient temperature molten salt is small.

The conducting agent improves the power collection performance of the positive electrode active material and suppresses contact resistance between the positive electrode active material and the positive electrode collector. Examples of the conducting agent include agents containing acetylene black, carbon black, artificial graphite, natural graphite, and a conductive polymer.

The binding agent fills gaps between the dispersed positive electrode active material to bind the positive active material and the conducting agent and bind the positive electrode active material and the positive electrode collector. Examples of the binding agent include agents containing polytetrafluoroethylene (PTFE), polyvinylidene fluoride (PVdF), and fluorine-based rubber. As the binding agent, modified PVdF substituted with at least another substituent, a copolymer of vinylidene fluoride and propylene hexafluoride, and a terpolymer of polyvinylidene fluoride, tetrafluoroethylene, and propylene hexafluoride can be used in association with the above materials.

For example, N-methyl-2-pyrrolidone (NMP) or dimethylformamide (DMF) can be used as an organic solvent dispersing the binding agent.

In the positive electrode layer $5b$, the positive electrode active material and the binding agent are preferably mixed at ratios of 80% by mass or more and 98% by mass or less, and 2% by mass or more and 20% by mass, or less respectively. By setting the amount of binding agent to be 2% by mass or more, sufficient electrode intensity can be obtained. By setting the amount of binding agent included in the positive electrode layer $5b$ to be 20% by mass or less, it is possible to reduce a mixture amount of insulator of the electrode and reduce internal resistance.

When the conducting agent is added to the positive electrode layer $5b$, the positive electrode active material, the conducting agent, and the binding agent are mixed at ratios of 77% by mass or more and 95% by mass or less, 2% by mass or more and 20% by mass or less, and 3% by mass or more and 15% by mass or less, respectively, and are more preferably mixed at ratios of 80% by mass or more and 95% by mass or less, 3% by mass or more and 18% by mass or less, and 2% by mass or more and 17% by mass or less, respectively.

By setting a content of the conducting agent to be 2% by mass or more and preferably 3% by mass or more, it is possible to obtain the above-described advantages. By setting the content of the conducting agent to be 20% by mass or less and preferably 18% by mass or less, it is possible to reduce decomposition of the nonaqueous electrolyte on the conductive agent surface in high temperature preservation.

The positive electrode collector $5a$ is preferably, for example, an aluminum foil or an aluminum alloy foil containing an element such as Mg, Ti, Zn, Mn, Fe, Cu, or Si. A stainless foil, a titanium foil, or the like can also be used as the positive electrode collector $5a$. The thickness of the positive electrode collector $5a$ is preferably within the range of 8 μm to 25 μm.

When the foregoing aluminum foil is used as the positive electrode collector $5a$, the purity of the aluminum foil is preferably 99% or more.

When the foregoing aluminum alloy foil is used as the positive electrode collector $5a$, it is preferable to suppress a content of a transition metal such as Fe or Cu to 1% by mass or less.

The positive electrode 5 can be produced, for example, by suspending the positive electrode active material, the conducting agent, and the binding agent in a general solvent to prepare a slurry, applying the slurry to the positive electrode collector $5a$ and performing drying, and then performing pressing. The positive electrode 5 may be produced by forming the positive electrode active material, the conducting agent, and the binding agent in a pellet form to make the positive electrode layer $5b$, and disposing and forming the positive electrode layer $5b$ on the positive electrode collector $5a$.

(4) Nonaqueous Electrolyte

For example, a liquid nonaqueous electrolyte prepared by dissolving a solute in an organic solvent or a gel-like nonaqueous electrolyte in which a liquid electrolyte and a polymer material are composited can be used as the nonaqueous electrolyte.

As the liquid nonaqueous electrolyte, it is desirable to use an electrolyte obtained by dissolving a solute in an organic solvent at a density equal to or greater than 0.5 mol/L and equal to or less than 2.5 mol/L.

One or more kinds of lithium salts selected from lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonimide [$LiN(CF_3SO_2)_2$], [$LiN(C_2F_5SO_2)_2$], [$Li(CF_3SO_2)_3C$], and $LiB[(OCO)_2]_2$ is preferable as an example of the solute. The lithium salt is dissolved in an organic solvent at a density within the range of 0.5 mol/L to 2 mol/L to make an organic electrolytic solution.

A solute which is rarely oxidized at a high potential is preferably used and $LiPF_6$ is most preferably used.

Examples of the organic solvent include cyclic carbonates such as propylene carbonate (PC), ethylene carbonate (EC), or vinylene carbonate, chain carbonates such as diethyl carbonate (DEC), dimethyl carbonate (DMC), and methylethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), and γ-butyrolactone (GBL), acetonitrile (AN), and sulfolane (SL). Such organic solvents can be used solely or in a mixed solvent form.

Of the above examples, a mixed solvent in which at least two solvents are mixed from the group of propylene carbonate (PC), ethylene carbonate (EC), and diethyl carbonate (DEC) or a mixed solvent containing γ-butyrolactone (GBL) can be used as a preferable organic solvent. By using such a mixed solvent, it is possible to obtain a nonaqueous electrolyte battery having excellent high-temperature characteristics.

Examples of the polymer material forming the gel-like nonaqueous electrolyte include materials containing polyvinylidene fluoride (PVdF), polyacrylonitrile (PAN), and polyethylene oxide (PEO).

An ambient temperature molten salt (ionic melt) containing lithium ions can also be used as the nonaqueous electrolyte. For example, when an electrolyte which is an ionic melt formed of lithium ions, organic cations and anions and is a liquid at a temperature equal to or less than 100° C. and preferably at a temperature equal to or less than room temperature is selected as the nonaqueous electrolyte, it is possible to obtain the nonaqueous electrolyte battery with a broad range of operation temperatures.

(5) Separator

As the separator 4, for example, a porous film containing polyethylene, polypropylene, cellulose, or polyvinylidene fluoride (PVdF) or a nonwoven fabric made of a synthetic resin can be used. As the porous film appropriately used for the separator 4, a film made of polyethylene, polypropylene, or both thereof can be used. The separator 4 formed of such a material is preferable since, when a battery temperature increases and reaches a given temperature, the separator 4 is melted, so that a shutdown function of blocking pores and considerably attenuating a charging and discharging current is easily added and stability of the nonaqueous electrolyte battery can be improved.

In terms of reducing cost, the separator 4 formed of a cellulose-based material may be used.

Figure 5:
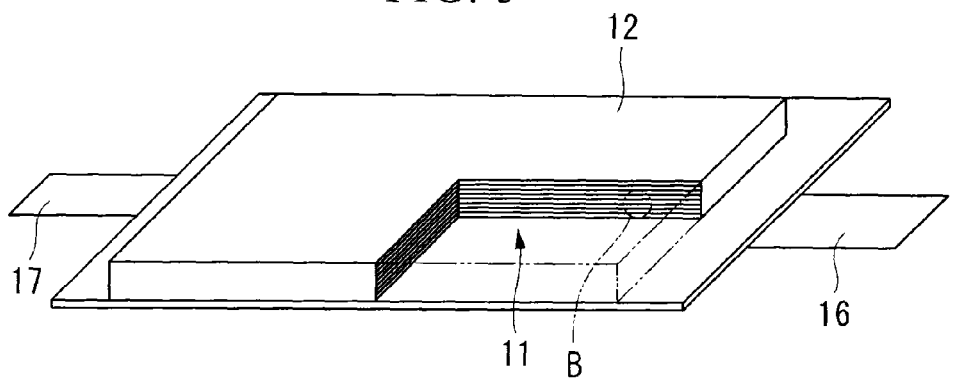
FIG. 5 is a partial cutout perspective view schematically illustrating another example of the nonaqueous electrolyte battery according to the second embodiment.
Figure 6:
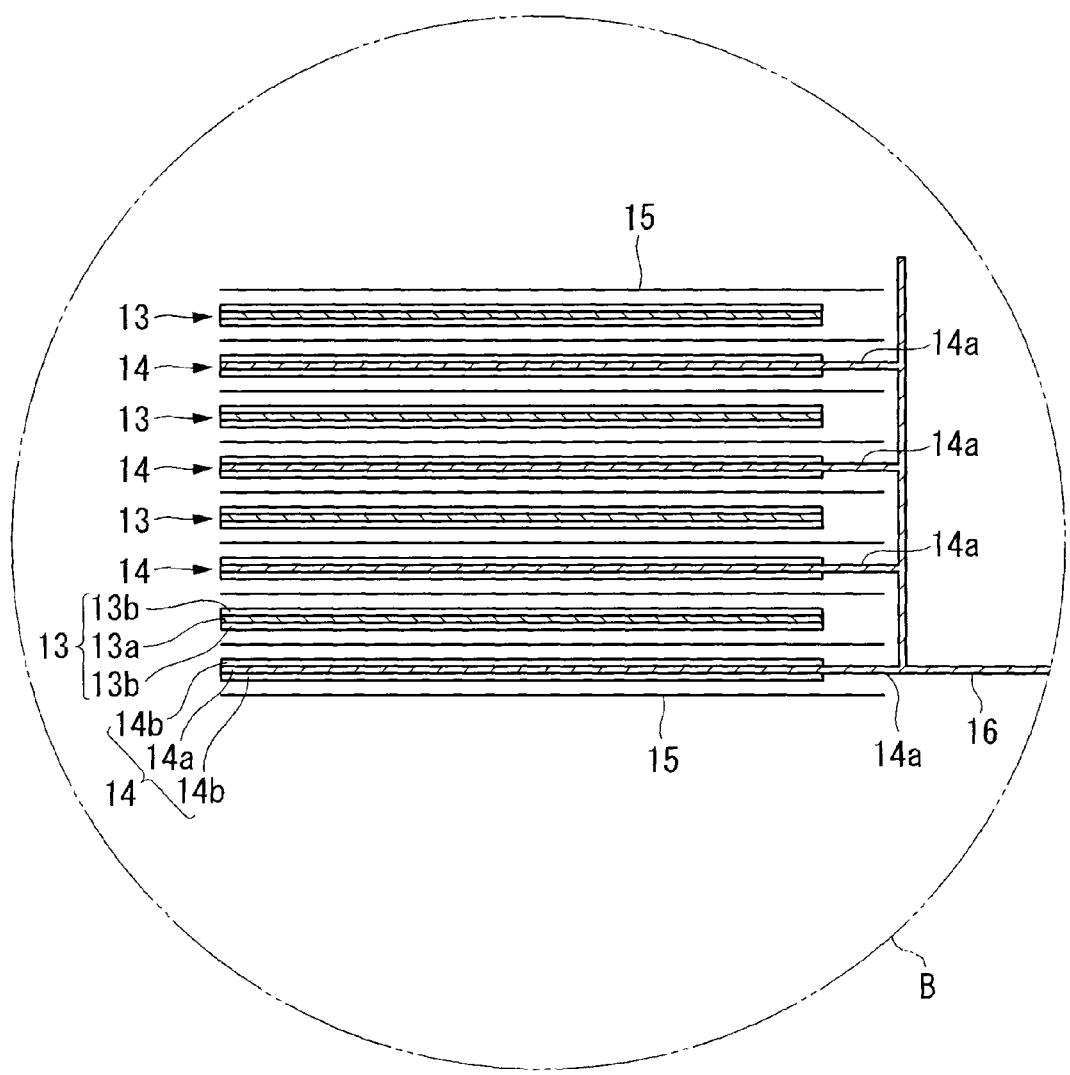
FIG. 6 is an enlarged schematic sectional view illustrating a part B of FIG. 5.

The configuration of the nonaqueous electrolyte battery according to the second embodiment is not limited to the above-described configuration illustrated in FIGS. 3 and 4. For example, a battery having a configuration illustrated in FIGS. 5 and 6 may be used. FIG. 5 is a partial cutout perspective view schematically illustrating another flat type nonaqueous electrolyte battery (nonaqueous electrolyte battery) according to the second embodiment. FIG. 6 is an enlarged schematic sectional view illustrating a part B of FIG. 5.

The nonaqueous electrolyte battery illustrated in FIGS. 5 and 6 is configured such that a lamination type electrode group 11 is accommodated inside an exterior member 12. As illustrated in FIG. 6, the lamination type electrode group 11 has a structure in which positive electrodes 13 and negative electrodes 14 are alternately laminated with separators 15 interposed therebetween.

As illustrated in FIG. 6, the plurality of positive electrodes 13 are present and each include a positive electrode collector 13a and positive electrode layers 13b supported on both surfaces of the positive electrode collector 13a. The positive electrode layer 13b contains a positive electrode active material.

As illustrated in FIG. 6, as in the positive electrodes 13, the plurality of negative electrodes 14 are present and each includes a negative electrode collector 14a and negative electrode layers 14b supported on both surfaces of the negative electrode collector 14a. The negative electrode layer 14b contains the negative electrode active material. The negative electrode active material contains the battery active material according to the first embodiment. One side of the negative electrode collector 14a of each negative electrode 14 protrudes from the negative electrode 14. The protruding negative electrode collector 14a is electrically connected to a strip-shaped negative electrode terminal 16. The front end of the strip-shaped negative electrode terminal 16 is drawn from the exterior member 12 to the outside. Although not illustrated, the side of the positive electrode collector 13a of the positive electrode 13 located opposite to the protruding side of the negative electrode collector 14a protrudes from the positive electrode 13. The positive electrode collector 13a protruding from the positive electrode 13 is electrically connected to a strip-shaped positive electrode terminal 17. The front end of the strip-shaped positive electrode terminal 17 is located on an opposite side to the negative electrode terminal 16 and is drawn from a side of the exterior member 12 to the outside.

The material, a mixture ratio, dimensions, and the like of each member included in the nonaqueous electrolyte battery illustrated in FIGS. 5 and 6 are configured to be the same as those of each constituent member of the nonaqueous electrolyte battery 100 described in FIGS. 3 and 4.

In the above-described embodiment, it is possible to provide the nonaqueous electrolyte battery having excellent charging and discharging cycle performance.

Third Embodiment

Next, a battery pack according to a third embodiment will be described in detail.

The battery pack according to the embodiment includes at least one nonaqueous electrolyte battery (that is, a single battery) according to the foregoing second embodiment. When the plurality of single batteries are included in the battery pack, the single batteries are electrically connected in series, in parallel, or in series and parallel to be disposed.

Figure 7:
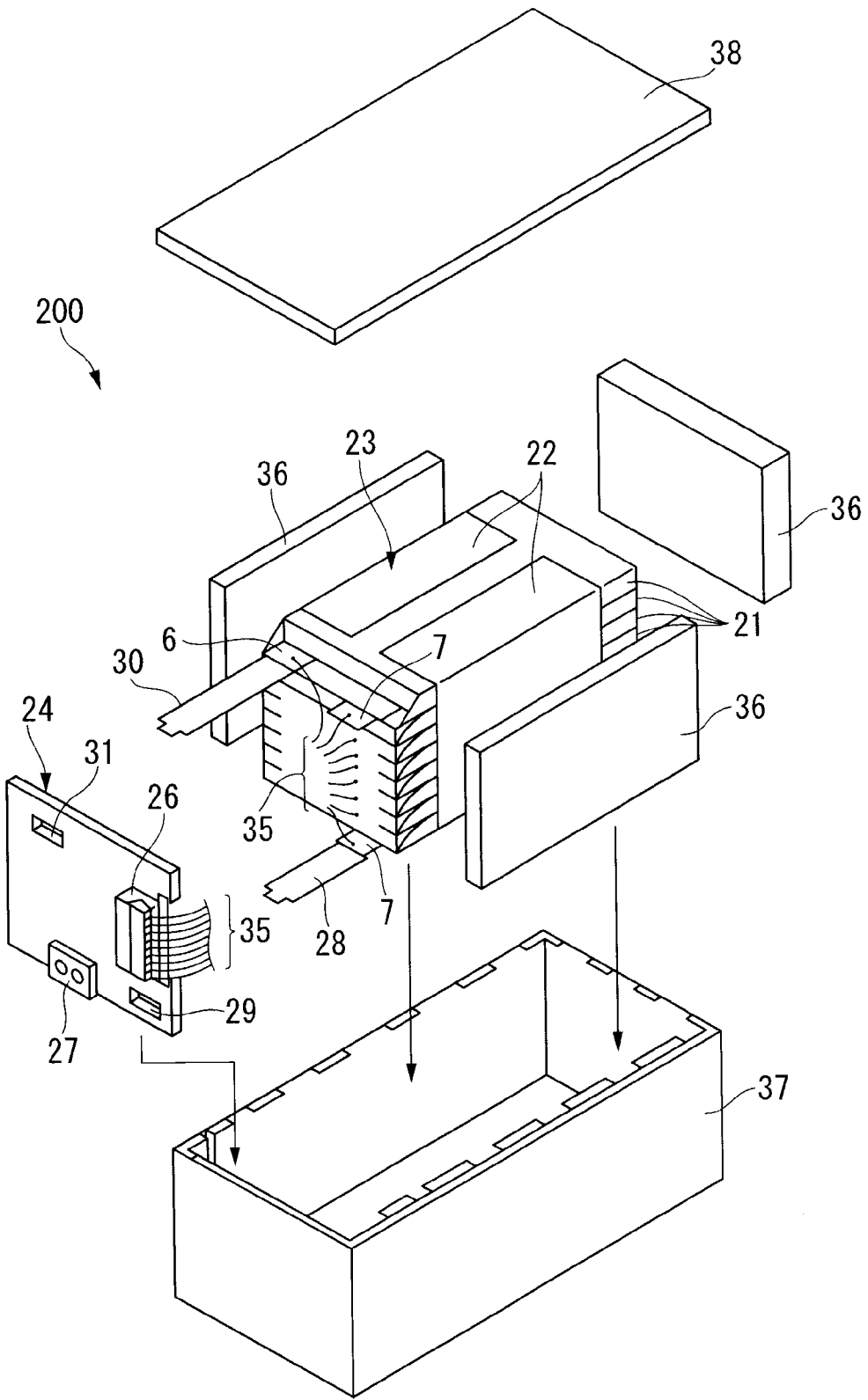
FIG. 7 is an exploded perspective view illustrating a battery pack according to a third embodiment.
Figure 8:
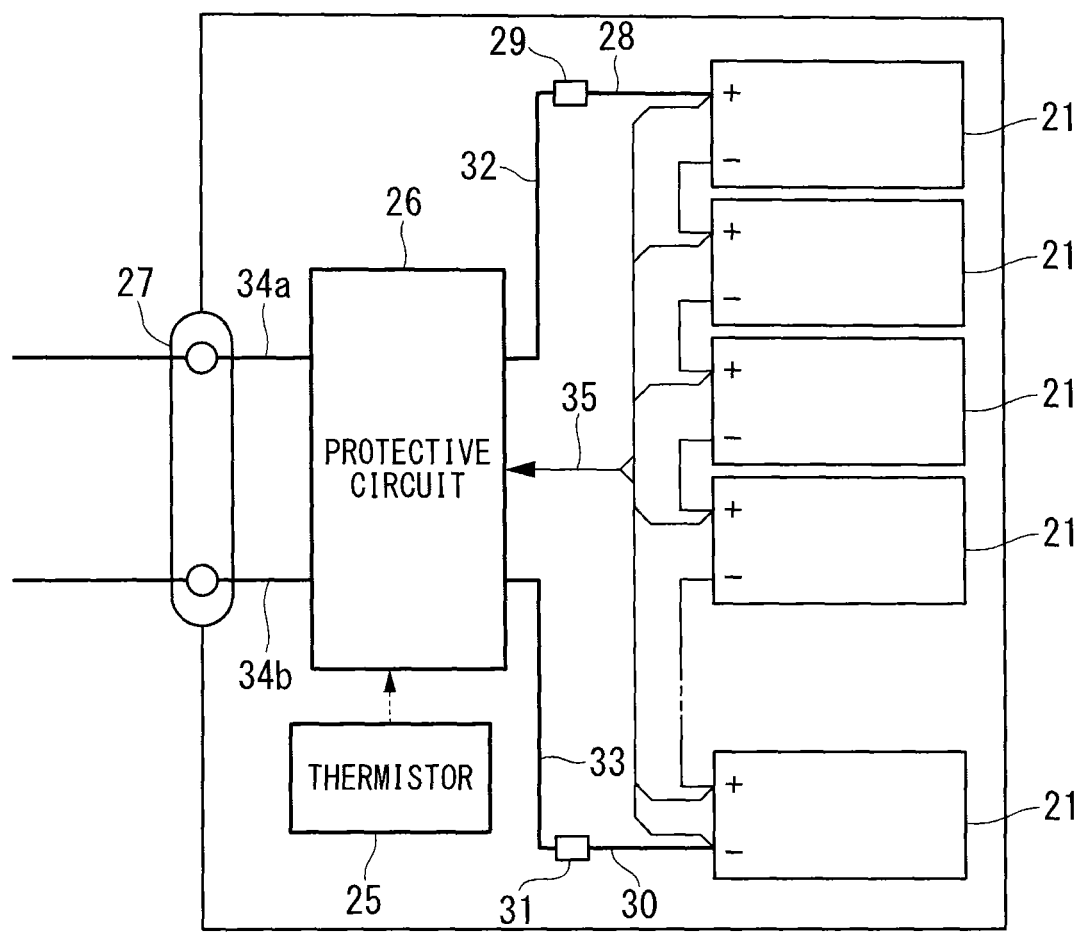
FIG. 8 is a block diagram illustrating an electric circuit included in the battery pack illustrated in FIG. 7.

Referring to FIGS. 7 and 8, a battery pack 200 according to the embodiment will be described specifically. In the battery pack 200 illustrated in FIG. 7, the flat type nonaqueous electrolyte battery 100 illustrated in FIG. 3 is used as a single battery 21.

The plurality of single batteries 21 are laminated so that the negative electrode terminals 6 and the positive electrode terminals 7 extending to the outside are arranged in the same direction, and thus assembled batteries 23 are configured by fastening using an adhesive tape 22. The single batteries 21 are mutually connected electrically in series, as illustrated in FIGS. 7 and 8.

A printed wiring board 24 is disposed to face the side surfaces of the single batteries 21 in which the negative electrode terminals 6 and the positive electrode terminals 7 extend. As illustrated in FIG. 7, a thermistor 25 (see FIG. 8), a protective circuit 26, and an electrifying terminal 27 to an external device are mounted on the printed wiring board 24. An insulation plate (not illustrated) is mounted on the surface of the printed wiring board 24 facing the assembled batteries 23 in order to avoid unnecessary connection with wirings of the assembled batteries 23.

A positive-side lead 28 is connected to the positive electrode terminal 7 located in the lowermost layer of the assembled batteries 23 and the front end of the positive electrode-side lead 28 is inserted into a positive electrode-side connector 29 of the printed wiring board 24 to be electrically connected. A negative electrode-side lead 30 is connected to the negative electrode terminal 6 located in the uppermost layer of the assembled batteries 23 and the front end of the negative electrode-side lead 30 is inserted into a negative electrode-side connector 31 of the printed wiring board 24 to be electrically connected. These connectors 29 and 31 are connected to the protective circuit 26 via wirings 32 and 33 (see FIG. 8) formed in the printed wiring board 24.

The thermistor 25 is used to detect a temperature of the single battery 21. Although not illustrated in FIG. 7, the thermistor 25 is installed near the single batteries 21 and a detection signal is transmitted to the protective circuit 26. The protective circuit 26 blocks a plus-side wiring 34a and a minus-side wiring 34b between the protective circuit 26 and the electrifying terminal 27 connected to an external device under a predetermined condition. Here, for example, the predetermined condition is that the detection temperature of the thermistor 25 be equal to or greater than a predetermined temperature. The predetermined condition is also that an overcharge, overdischarge, overcurrent, or the like of the single battery 21 be detected. The detection of the overcharge or the like is performed for the individual single batteries 21 or all of the single batteries 21. When the overcharge or the like is detected in the individual single batteries 21, a battery voltage may be detected, or a positive electrode potential or a negative electrode potential may be detected. In the latter case, lithium electrodes used as reference poles are inserted into the individual single batteries 21. In the case of FIGS. 7 and 8, wirings 35 are connected to detect the respective voltages of the single batteries 21 and detection signals are transmitted to the protective circuit 26 via the wirings 35.

As illustrated in FIG. 7, protective sheets 36 formed of rubber or resin are disposed on three side surfaces of the assembled batteries 23 excluding the side surface from which the positive electrode terminals 7 and the negative electrode terminals 6 protrude.

The assembled batteries 23 are accommodated along with the protective sheets 36 and the printed wiring board 24 inside an accommodation container 37. That is, the protective sheets 36 are disposed on both of the inner surfaces of the accommodation container 37 in the longer side direction and the inner surface in the shorter side direction, and the printed wiring board 24 is disposed on the inner surface opposite to the protective sheet 36 in the shorter side direction. The assembled batteries 23 are located in a space surrounded by the protective sheets 36 and the printed wiring board 24. A cover 38 is mounted on the upper surface of the accommodation container 37.

When the assembled batteries 23 are fixed, a thermal shrinkage tape may be used instead of the adhesive tape 22. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, in FIGS. 7 and 8, the single batteries 21 connected in series are illustrated. However, to increase a battery capacity, the single batteries 21 may be connected in parallel or may be connected in a combination form of series connection and parallel connection. The assembled battery packs can also be connected in series or in parallel.

According to the above-described embodiment, by providing the nonaqueous electrolyte batteries having the excellent charging and discharging cycle performance of the foregoing second embodiment, it is possible to provide the battery pack having the excellent charging and discharging cycle performance.

The form of the battery pack can be appropriately modified according to a use application. A use application of the battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the battery pack using the nonaqueous electrolyte batteries with excellent high temperature characteristics is appropriately used for vehicles.

EXAMPLES

Next, the invention will be described more specifically according to examples and comparative examples. However, the scope of the invention is not limited to the examples, and the invention may be modified appropriately in the scope of the invention without departing from the gist of the invention.

Examples 1 and 2 and Comparative Example 1

Synthesizing Niobium Composite Oxide

First, niobium pentoxide ($Nb_2O_5$) and titanium dioxide ($TiO_2$) having an anatase structure were mixed and were burned at 1100° C. for 24 hours, so that a niobium composite oxide with a composition formula $TiNb_2O_7$ was obtained.

At this time, it was confirmed that the obtained material was the niobium composite oxide with the composition formula $TiNb_2O_7$ by a wide-angle X-ray diffraction method to be described below.

Next, 150 g of the niobium composite oxide with the composition formula $TiNb_2O_7$ and 5 g of polyethyleneglycol were added to 150 g of pure water and pulverization and dispersion processes were performed in a zirconia bead ball mill with 5 mmϕ for 12 hours to prepare a uniform slurry. Subsequently, the slurry was sprayed in the atmosphere of 180° C. and was dried to obtain granules (secondary particles) with an average particle diameter of about 10 μm formed of primary particles with an average particle diameter of 0.6 μm. Thereafter, the obtained granules were burned in the air at 900° C. for 3 hours to obtain sample A1. In this way, Comparative Example 1 was prepared.

Next, the sample A1 (100 g) was added to a water solution made by adding and dissolving 3 g of phosphoric acid in 100 g of pure water and was left in a drying machine at 80° C. while being stirred so that moisture was evaporated, to obtain sample A2. In this way, Example 1 was prepared.

Subsequently, sample A2 was subjected to a thermal treatment in the air at 400° C. for 3 hours to obtain sample A3. In this way, Example 2 was prepared.

<Wide-Angle X-Ray Diffraction Method>

Figure 9:
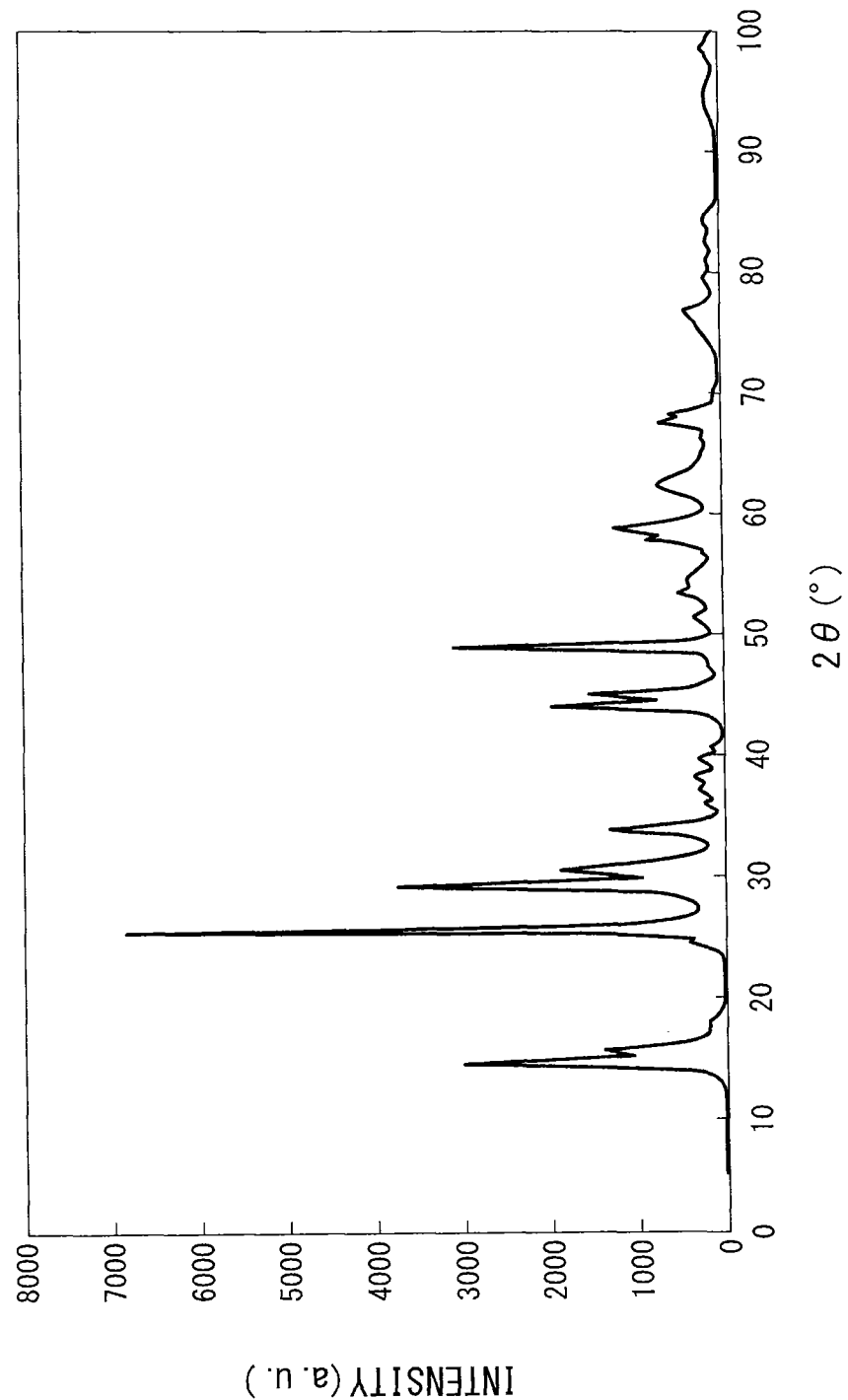
FIG. 9 is a graph illustrating an X-ray diffraction pattern of a niobium composite oxide in Example 1.

The niobium composite oxide (Examples 1 and 2 and Comparative Example 1) obtained through the above processes was filled in a standard glass holder with a diameter of 25 mm and measurement was performed according a wide-angle X-ray diffraction method. From an X-ray diffraction pattern obtained in this measurement, as illustrated in FIG. 9, a monoclinic niobium composite oxide which is represented by the composition formula $TiNb_2O_7$ and belongs to a space group C/2m and for which a main material forming the niobium composite oxide belongs to Joint Committee on Powder Diffraction Standards (JCPDS): 39-1407 was confirmed.

Hereinafter, apparatuses and conditions used in the measurement are as follows.

(1) X-ray generation apparatus, RU-200 R (rotating cathode type) manufactured by Rigaku Corporation,
  X-ray source: CuKα ray
  use of curved crystal monochromator (graphite)
  power: 50 kV, 200 mA
(2) goniometer, 215552 type manufactured by Rigaku Corporation
  slit system: 1°-1°-0.15 mm to 0.45 mm
  detector: scintillation counter
(3) counting and recording apparatus, RINT1400 type manufactured by Rigaku Corporation
(4) scanning type, 2θ/θ continuous scanning
(5) qualitative analysis
  measurement range (2θ), 5° to 100°
  scanning speed, 2°/minute
  step width (2θ), 0.02°

<Phosphorus Content>

A phosphorus content on the surface of the niobium composite oxide obtained through the above processes in Examples 1 and 2 and Comparative Example 1 was measured by acid decomposition-ICP emission spectroscopy (measurement apparatus: SPS-4000 manufactured by SII Nanotechnology Inc.).

A distribution state of phosphorus on the surface of the niobium composite oxide in Examples 1 and 2 and Comparative Example 1 was confirmed by performing cross-section TEM-EDX analysis of aggregated particles and acquiring a mapping image.

<Production of Electrode>

Powder of the niobium composite oxide (Examples 1 and 2 and Comparative Example 1) obtained in each process at 90% by mass, acetylene black serving as a conducting agent at 5% by mass, and polyvinylidene fluoride (PVdF) at 5% by mass were added to N-methyl-pyrrolidone (NMP) and were mixed to prepare a slurry. Subsequently, the slurry was applied to both surfaces of the collector formed of an aluminum foil with a thickness of 12 μm and was dried. Thereafter, a negative electrode with electrode density of 2.8 g/cm³ was obtained by performing pressing.

<Preparation of Liquid Nonaqueous Electrolyte>

Ethylene carbonate (EC) and diethyl carbonate (DEC) were mixed at a volume ratio of 1:2 to form a mixed solvent. $LiPF_6$, which is an electrolyte, was dissolved in the mixed solvent at density of 1 mol/L to obtain a liquid nonaqueous electrolyte.

<Manufacturing of Beaker Cell>

A beaker cell in which the electrode produced in the foregoing order was set as an operational electrode and a lithium metal was used as an opposite electrode and a reference pole was produced, and the above-described liquid nonaqueous electrolyte was injected to complete the beaker cell of Examples 1 and 2 and Comparative Example 1.

<Measurement of Battery Performance>

Constant current-constant voltage discharging was performed on the beaker cell manufactured above in Examples 1 and 2 and Comparative Example 1 at 1 C and 1 V for 3 hours under the environment of 25° C. (lithium insertion), and then charging and discharging cycles in which 1 C constant current charging (lithium discharge) was performed up to 3 V was performed 100 times. Thus, a capacity obtained after 100 charging and discharging cycles with respect to an initial capacity was calculated as a capacity retention ratio (%).

Figure 10:
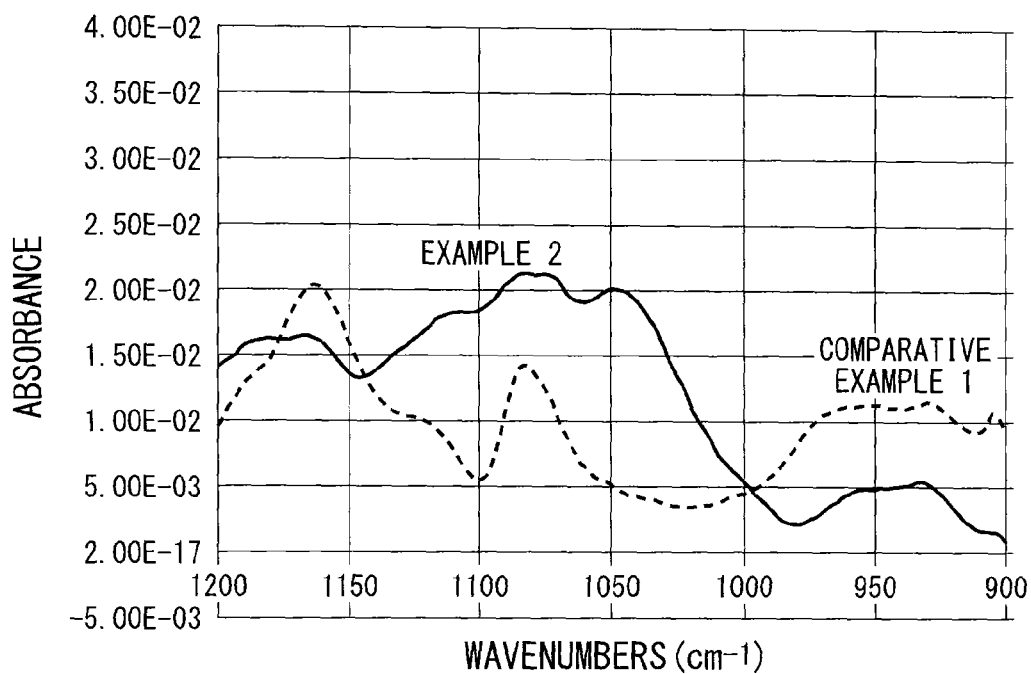
FIG. 10 is a graph illustrating an infrared diffusion reflectance spectrum ($900 \text{ cm}^{-1}$ to $1200 \text{ cm}^{-1}$) of an electrode surface in Comparative Example 1 and Example 2.

The result is shown in Table 1 below.

belonging to the phosphate ions in about 1050 $cm^{-1}$ of an FT-IR spectrum was confirmed only in samples A2 and A3. As shown in an infrared diffusion reflectance spectrum (900 $cm^{-1}$ to 1200 $cm^{-1}$) of the electrode surface in FIG. 10, a peak belonging to the phosphate ions near about 1050 $cm^{-1}$ can be understood to be present in sample A3 (Example 2) whereas no peak belonging to the phosphate ions can be seen in sample A1 (Comparative Example 1).

Examples 3 to 6

First, niobium pentoxide ($Nb_2O_5$) and titanium dioxide ($TiO_2$) having an anatase structure were mixed and were burned at 1100° C. for 24 hours, so that a niobium composite oxide with a composition formula $TiNb_2O_7$ was obtained.

Next, 150 g of the niobium composite oxide with the composition formula $TiNb_2O_7$ and 5 g of polyethyleneglycol were added to 150 g of pure water and pulverization and dispersion processes were performed in a zirconia bead ball mill with 5 mmϕ for 12 hours to prepare a uniform slurry. Subsequently, the slurry was sprayed in the atmosphere of 180° C. and was dried to obtain granules (secondary particles) with an average particle diameter of about 10 μm formed of primary particles with an average particle diameter of 0.6 μm. Thereafter, the obtained granules were burned in the air at 900° C. for 3 hours.

Subsequently, the granules (100 g) after the burning were added to a water solution made by adding and dissolving 0.2

TABLE 1

| | | Phosphorus Content [% by mass] | Primary Particle Diameter [μm] | Specific Surface Area [m²/g] | Peak at 1050 $cm^{-1}$ | Peak at 1650 $cm^{-1}$ | Initial Capacity [mAh/g] | Initial Efficiency [%] | Capacity Retention Ratio [%] |
|---|---|---|---|---|---|---|---|---|---|
| Comparative Example 1 | Sample A1 | 0 | 0.6 | 14 | Absence | Absence | 256 | 87 | less than 10 |
| Example 1 | Sample A2 | 0.41 | 0.6 | 15 | Presence | Presence | 280 | 93 | 72 |
| Example 2 | Sample A3 | 0.38 | 0.6 | 12 | Presence | Presence | 282 | 94 | 78 |

The presence of phosphorus on the surface of the niobium composite oxide was confirmed by performing cross-section TEM observation on sample A2 (Example 1) and sample A3 (Example 2) obtained through the above process. As a result, in sample A2, a phosphorus presence region (thickness of a surface layer) on the surface of the niobium composite oxide was not uniform and a phosphorus compound was partially attached. In contrast, in sample A3 subjected to the thermal treatment, a phosphorus presence region was understood to be formed across the surface layer of the niobium composite oxide and the thickness of the phosphorus presence region was also understood to be uniform. That is, it was considered that the phosphoric acid was reacted with a base material to form Nb—O—P or Ti—O—P bonding by performing the thermal treatment, and thus a coated film (phosphorus-niobium-titanium composite oxide) with higher adhesion was formed.

Infrared diffusion reflectance measurement was performed on samples A1, A2, and A3 using Fourier Transform Infrared Spectroscopy (FT-IR). As a result, the presence of a peak g of phosphoric acid in 100 g of pure water and were left in a drying machine at 80° C. while being stirred so that moisture was evaporated.

Subsequently, a thermal treatment was performed on the dried granules in the air at 400° C. for 3 hours to obtain a niobium composite oxide (battery active material) of Example 3.

Then, a phosphorus content of the niobium composite oxide was measured according to the same method as that of Examples 1 and 2 above.

Subsequently, a beaker cell was produced using the same conditions and processes as those of Examples 1 and 2 above using the obtained niobium composite oxide (battery active material), and the evaluation was performed similarly.

Except that the foregoing amount of added phosphoric acid was changed to 1 g (Example 4), 6 g (Example 5), and 20 g (Example 6), the battery active material was compounded as in Example 3, and evaluation was performed through the same method.

The result is shown in Table 2 below.

TABLE 2

| | Phosphorus Content [% by mass] | Primary Particle Diameter [μm] | Specific Surface Area [m²/g] | Peak at 1050 cm⁻¹ | Peak at 1650 cm⁻¹ | Initial Capacity [mAh/g] | Initial Efficiency [%] | Capacity Retention Ratio [%] |
|---|---|---|---|---|---|---|---|---|
| Example 3 | 0.02 | 0.6 | 14 | Presence | Presence | 268 | 91 | 68 |
| Example 4 | 0.10 | 0.6 | 12 | Presence | Presence | 280 | 94 | 80 |
| Example 5 | 1.0 | 0.6 | 12 | Presence | Presence | 278 | 94 | 78 |
| Example 6 | 3.1 | 0.6 | 10 | Presence | Presence | 270 | 94 | 76 |

As shown in Table 2, the capacity retention ratio increases with an increase in the amount of phosphorus, but the capacity decreases. That is, since the phosphorus compound does not contribute to charging and discharging, the capacity decreases with an increase in the amount of phosphorus. From the foregoing result, a more preferable amount of phosphorus can be understood to be within the range of 0.1% to 1.0% in terms of a capacity and a lifespan.

Examples 7 and 8 and Comparative Example 2

Niobium hydroxide ($Nb(OH)_5$) was burned at 1100° C. for 24 hours to obtain a monoclinic niobium oxide ($M-Nb_2O_5$).

Subsequently, 150 g of $M-Nb_2O_5$ and 5 g of polyethyleneglycol were added to 150 g of pure water and pulverization and dispersion processes were performed in a zirconia bead ball mill with 5 mmφ for 12 hours to prepare a uniform slurry. Subsequently, the slurry was sprayed in the atmosphere of 180° C. and was dried to obtain granules (secondary particles) with an average particle diameter of about 10 μm formed of primary particles with an average particle diameter of 0.6 μm. Thereafter, the obtained granules were burned in the air at 900° C. for 3 hours to obtain sample B1. In this way, Comparative Example 2 was prepared.

Subsequently, the sample B1 (100 g) was added to a water solution made by adding and dissolving 3 g of phosphoric acid in 100 g of pure water and was left in a drying machine at 80° C. while being stirred so that moisture was evaporated, to obtain sample B2. In this way, Example 7 was prepared.

Subsequently, sample B2 was subjected to a thermal treatment in the air at 400° C. for 3 hours to obtain sample B3. In this way, Example 8 was prepared.

Then, in Examples 7 and 8 and Comparative Example 2, a phosphorus content of the obtained niobium composite oxide was measured according to the same method as that of Examples 1 and 2 above.

Subsequently, a beaker cell was produced using the same conditions and processes as those of Examples 1 and 2 above using the niobium composite oxide (battery active material) obtained in Examples 7 and 8 and Comparative Example 2, and the evaluation was performed similarly.

The result is shown in Table 3 below.

TABLE 3

| | | Phosphorus Content [% by mass] | Primary Particle Diameter [μm] | Specific Surface Area [m²/g] | Peak at 1050 cm⁻¹ | Peak at 1650 cm⁻¹ | Initial Capacity [mAh/g] | Initial Efficiency [%] | Capacity Retention Ratio [%] |
|---|---|---|---|---|---|---|---|---|---|
| Comparative Example 2 | Sample B1 | 0 | 0.6 | 12 | Absence | Absence | 228 | 85 | less than 10 |
| Example 7 | Sample B2 | 0.40 | 0.6 | 12 | Presence | Presence | 242 | 91 | 68 |
| Example 8 | Sample B3 | 0.38 | 0.6 | 11 | Presence | Presence | 248 | 92 | 75 |

As in the case of Example 1, the obtained material was measured according to the wide-angle X-ray diffraction method. The material was represented by a general formula $Li_xM_{(1-y)}Nb_yNb_2O_{(7+\delta)}$ and was identified as a monoclinic niobium composite oxide (space group P12/m1) belonging to the JCPDS card #27-1313.

The presence of phosphorus on the surface of the niobium composite oxide was confirmed by performing cross-section TEM observation on samples obtained in Examples 7 and 8. As a result, in Example 7, a phosphorus presence region (thickness of a surface layer) was not uniform and a phosphorus compound was partially attached. In contrast, in Example 8 in which the thermal treatment was performed, a phosphorus presence region was understood to be formed across the surface layer of the niobium composite oxide and the thickness of the phosphorus presence region was also understood to be uniform. It was considered that the phosphoric acid was reacted with a base material to form Nb—O—P bonding by performing the thermal treatment, and thus a coated film (phosphorus-niobium composite oxide) with higher adhesion is was formed.

Infrared diffusion reflectance measurement was performed on samples B1, B2, and B3 using Fourier Transform Infrared Spectroscopy (FT-IR). As a result, the presence of a peak belonging to the phosphate ions in about 1050 cm$^{-1}$ of an FT-IR spectrum was confirmed only in sample B2 (Example 7) and sample B3 (Example 8).

Comparative Examples 3, 4, 5

Compounding of Spinel Type Titanium Composite Oxide

Lithium carbonate ($Li_2CO_3$) and titanium dioxide ($TiO_2$) having an anatase structure were mixed and were burned at 850° C. for 24 hours, so that a spinel type lithium-titanium composite oxide ($Li_4Ti_5O_{12}$) was compounded.

Subsequently, 150 g of $Li_4Ti_5O_{12}$ and 5 g of polyethyleneglycol were added to 150 g of pure water and pulverization and dispersion processes were performed in a zirconia bead ball mill with 5 mm$\phi$ for 12 hours to prepare a uniform slurry. Subsequently, the slurry was sprayed in the atmosphere of 180° C. and was dried to obtain granules (secondary particles) with an average particle diameter of about 10 μm formed of primary particles with an average particle diameter of 0.6 μm. Thereafter, the obtained granules were burned in the air at 900° C. for 3 hours to obtain sample C1. In this way, Comparative Example 3 was prepared.

Subsequently, sample C1 (100 g) was added to a water solution made by adding and dissolving 3 g of phosphoric acid in 100 g of pure water and was left in a drying machine at 80° C. while being stirred so that moisture was evaporated, to obtain sample C2. In this way, Comparative Example 4 was prepared.

Subsequently, a thermal treatment was performed on sample C2 in the air at 400° C. for 3 hours to obtain sample C3. In this way, Comparative Example 5 was prepared.

Then, in Comparative Examples 3, 4, and 5, a phosphorus content of the obtained spinel type titanium composite oxide was measured according to the same method as that of Examples 1 and 2 above.

Subsequently, a beaker cell was produced using the same conditions and processes as those of Examples 1 and 2 above using the spinel type titanium composite oxide (battery active material) obtained in Comparative Examples 3, 4, and 5, and the evaluation was performed similarly.

The result is shown in Table 4 below.

As in the case of Example 1, the obtained material was measured according to the wide-angle X-ray diffraction method. The material was represented by a general formula $Li_4Ti_5O_{12}$ and was identified as a cubic spinel type titanium composite oxide (space group Fd3-m) belonging to the JCPDS card #49-0207.

The presence of phosphorus on the surface of the spinel type titanium composite oxide was confirmed by performing cross-section TEM observation on samples obtained in Comparative Examples 4 and 5. As a result, in Comparative Example 4, a phosphorus presence region (thickness of a surface layer) was not uniform and a phosphorus compound was partially attached. In contrast, in Comparative Example 5 in which the thermal treatment was performed, a phosphorus presence region was understood to be formed across the surface layer of the spinel type titanium composite oxide and the thickness of the phosphorus presence region was also understood to be uniform.

Infrared diffusion reflectance measurement was performed on samples C1, C2, and C3 using Fourier Transform Infrared Spectroscopy (FT-IR). As a result, the presence of a peak belonging to the phosphate ions in about 1050 cm$^{-1}$ of an FT-IR spectrum was confirmed only in sample C2 (Comparative Example 4) and sample C3 (Comparative Example 5).

In Comparative Examples 3, 4, and 5, the same method as that of the niobium composite oxide according to the embodiments of the invention was applied to the titanium composite oxide. However, as shown in Table 4, the result of a low capacity was obtained in each comparative example and the same advantages as those obtained using the niobium composite oxide were not confirmed.

Examples 9 and 10 and Comparative Example 6

Except that niobium pentoxide ($Nb_2O_5$), zirconium dioxide ($ZrO_2$), and titanium dioxide ($TiO_2$) having an anatase structure were used as raw materials, a niobium composite oxide with a composition formula $Ti_{0.9}Zr_{0.1}Nb_2O_7$ was obtained in the same manner as in Example 1.

Subsequently, 150 g of $Ti_{0.9}Zr_{0.1}Nb_2O_7$ and 5 g of polyethyleneglycol were added to 150 g of pure water and pulverization and dispersion processes were performed in a zirconia bead ball mill with 5 mm$\phi$ for 12 hours to prepare a uniform slurry. Subsequently, the slurry was sprayed in the atmosphere of 180° C. and was dried to obtain granules (secondary particles) with an average particle diameter of about 10 μm formed of primary particles with an average particle diameter of 0.6 μm. Thereafter, the obtained granules were burned in the air at 900° C. for 3 hours to obtain sample D1. In this way, Comparative Example 6 was prepared.

TABLE 4

| | | Phosphorus Content [% by mass] | Primary Particle Diameter [μm] | Specific Surface Area [m$^2$/g] | Peak at 1050 cm$^{-1}$ | Peak at 1650 cm$^{-1}$ | Initial Capacity [mAh/g] | Initial Efficiency [%] | Capacity Retention Ratio [%] |
|---|---|---|---|---|---|---|---|---|---|
| Comparative Example 3 | Sample C1 | 0 | 0.8 | 10 | Absence | Absence | 162 | 96 | 99 |
| Comparative Example 4 | Sample C2 | 0.42 | 0.8 | 10 | Presence | Presence | 160 | 94 | 99 |
| Comparative Example 5 | Sample C3 | 0.40 | 0.8 | 10 | Presence | Presence | 160 | 95 | 99 |

Subsequently, the sample D1 (100 g) was added to a water solution made by adding and dissolving 3 g of phosphoric acid in 100 g of pure water and was left in a drying machine at 80° C. while being stirred so that moisture was evaporated, to obtain sample D2. In this way, Example 9 was prepared.

Subsequently, sample D2 was subjected to a thermal treatment in the air at 400° C. for 3 hours to obtain sample D3. In this way, Example 12 was prepared.

Then, in Examples 9 and 10 and Comparative Example 6, a phosphorus content of the obtained niobium composite oxide was measured according to the same method as that of Examples 1 and 2 above.

Subsequently, a beaker cell was produced using the same conditions and processes as those of Examples 1 and 2 above using the niobium composite oxide (battery active material) obtained in Examples 9 and 10 and Comparative Example 6, and the evaluation was performed similarly.

The result is shown in Table 5 below.

TABLE 5

| | | Phosphorus Content [% by mass] | Primary Particle Diameter [μm] | Specific Surface Area [m$^2$/g] | Peak at 1050 cm$^{-1}$ | Peak at 1650 cm$^{-1}$ | Initial Capacity [mAh/g] | Initial Efficiency [%] | Capacity Retention Ratio [%] |
|---|---|---|---|---|---|---|---|---|---|
| Comparative Example 6 | Sample D1 | 0 | 0.6 | 14 | Absence | Absence | 254 | 85 | less than 10 |
| Example 9 | Sample D2 | 0.40 | 0.6 | 15 | Presence | Presence | 277 | 93 | 72 |
| Example 10 | Sample D3 | 0.37 | 0.6 | 13 | Presence | Presence | 280 | 94 | 82 |

As in the case of Example 1, the obtained material was measured according to the wide-angle X-ray diffraction method. The material was identified as a niobium-zirconium-titanium composite oxide represented by a general formula $Ti_{0.9}Zr_{0.1}Nb_2O_7$.

The presence of phosphorus on the surface of the niobium composite oxide was confirmed by performing cross-section TEM observation on obtained sample D2 (Example 9) and sample D3 (Example 10). As a result, in sample D2, a phosphorus presence region (thickness of a surface layer) was not uniform and a phosphorus compound was partially attached. In contrast, in sample D3 subjected to the thermal treatment, a phosphorus presence region was understood to be formed across the surface layer of the niobium composite oxide and the thickness of the phosphorus presence region was also understood to be uniform.

Infrared diffusion reflectance measurement was performed on samples D1, D2, and D3 using Fourier Transform Infrared Spectroscopy (FT-IR). As a result, the presence of a peak belonging to the phosphate ions in about 1050 cm$^{-1}$ of an FT-IR spectrum was confirmed only in sample D2 (Example 9) and sample D3 (Example 10).

[Confirmation of Cell after Experiment]

Figure 11:
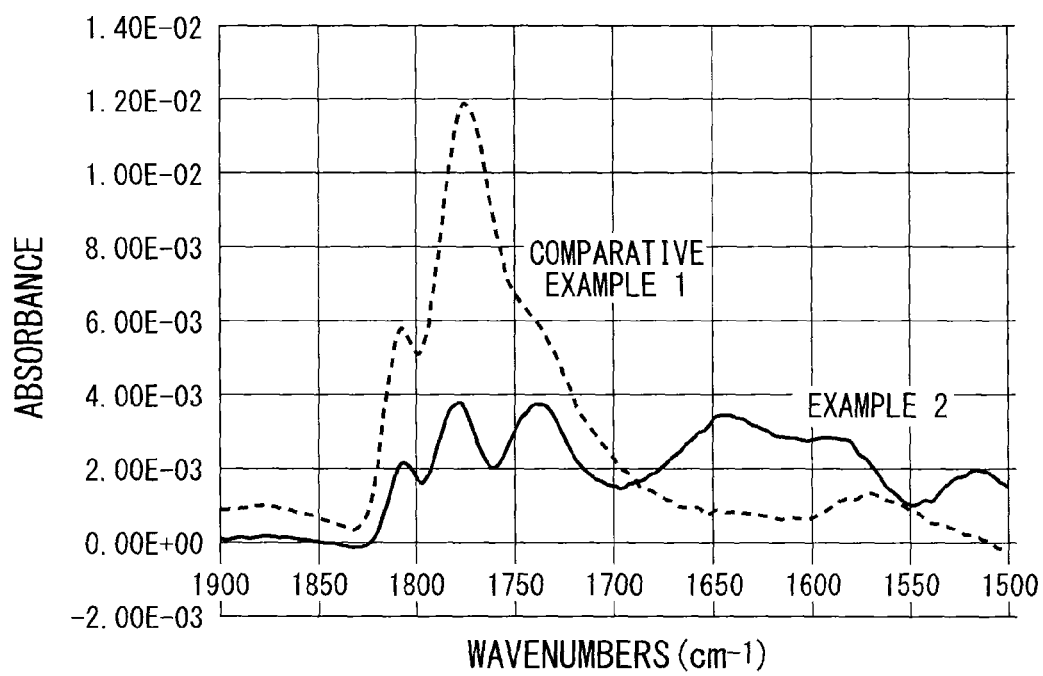
FIG. 11 is a graph illustrating an infrared diffusion reflectance spectrum ($1500 \text{ cm}^{-1}$ to $1900 \text{ cm}^{-1}$) of an electrode surface in Comparative Example 1 and Example 2.

The cell after the experiment of Comparative Example 1 and Example 2 using samples A1 and A3 in the active material was decomposed in a lithium-desorbed state and FT-IR measurement was performed on the electrode surface. As a result, as shown in an infrared diffusion reflectance spectrum (1500 cm$^{-1}$ to 1900 cm$^{-1}$) of the electrode surface in FIG. 11, a peak of 1050 cm$^{-1}$ confirmed in the active material of sample A3 (Example 2) was confirmed even in the electrode state after the experiment. In sample A3, peaks near 1770 cm$^{-1}$ and 1810 cm$^{-1}$ originating from a cyclic ester electrolyte decreased compared to sample A1 (Comparative Example 1). A peak belonging to a lithium alkyl carbonate originating from a surface film was confirmed near 1650 cm$^{-1}$ only in sample A3.

Based on the above analysis result, by disposing the phosphorus compound on the surface of the active material, an excessive electrolyte decomposition reaction continuously progressing after formation of a stable surface film in initial charging and discharging was considered to be suppressed.

As shown in Tables 1 to 5, the peak belonging to the lithium alkyl carbonate originating from the surface film was also confirmed near 1650 cm$^{-1}$ in the other examples.

In the above-described examples, as is apparent from Tables 1 to 5, initial charging and discharging efficiency was high and a lifespan was longer in Examples 1 to 10 in which the active material containing the niobium composite oxide according to the embodiments of the invention was used, compared to the battery of Comparative Examples 1 to 6.

On the other hand, as described in Comparative Examples 3, 4, and 5, the same advantages as those of the invention were not confirmed when the spinel type titanium composite oxide was used.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

DRAWINGS

FIG. 1
FIG. 2
FIG. 3
FIG. 4
FIG. 5
FIG. 6
FIG. 7
FIG. 8
FIG. 9
FIG. 10
FIG. 11

The invention claimed is:

1. A battery active material comprising:
a niobium composite oxide; and
a phosphorus compound being present on at least a part of a surface of the niobium composite oxide.

2. The battery active material according to claim 1, wherein a phosphorus content in the phosphorus compound is within the range of 0.02% by mass to 3% by mass with respect to an entire mass of the battery active material.

3. The battery active material according to claim 1, wherein the battery active material has a peak in a region 1050±30 cm$^{-1}$ in an infrared diffusion reflectance spectrum using Fourier Transform Infrared Spectroscopy (FT-IR).

4. The battery active material according to claim 1, wherein the battery active material has a peak in a region 1650±30 cm$^{-1}$ in an infrared diffusion reflectance spectrum using Fourier Transform Infrared Spectroscopy (FT-IR).

5. The battery active material according to claim 1, wherein the phosphorus compound is a phosphorus composite oxide or a phosphoric acid.

6. The battery active material according to claim 1, wherein the niobium composite oxide is a niobium composite oxide represented by a general formula $\{Li_xM_{(1-y)}Nb_yNb_2O_{(7+\delta)}\}$ (where in the general formula, M is at least one selected from Ti and Zr, and x, y, and δ satisfy relational expressions of 0≤x≤6, 0≤y≤1, and −1≤δ≤1).

7. The battery active material according to claim 1, wherein a crystal structure of the niobium composite oxide belongs to a space group C/2m or P12/ml.

8. The battery active material according to claim 1, wherein the battery active material is formed of aggregated particles which are primary particles of which an average particle diameter is within the range of 0.01 μm to 10 μm, and an average particle diameter of the aggregated particles is within the range of 1 μm to 100 μm.

9. A nonaqueous electrolyte battery comprising:
a negative electrode including the battery active material according to claim 1;
a positive electrode; and
a nonaqueous electrolyte.

10. A battery pack comprising: at least one nonaqueous electrolyte battery according to claim 9.

* * * * *